US005234754A

United States Patent [19]
Bache

[11] Patent Number: 5,234,754
[45] Date of Patent: Aug. 10, 1993

[54] SHAPED ARTICLE AND COMPOSITE MATERIAL AND METHOD FOR PRODUCING SAME

[76] Inventor: Hans H. Bache, Klovervej 7, Klokkerholm 9320 Hjallerup, Denmark

[21] Appl. No.: 243,157

[22] Filed: Sep. 9, 1988

Related U.S. Application Data

[63] Continuation of Ser. No. 880,332, Jun. 24, 1986, abandoned, which is a continuation of Ser. No. 470,628, Feb. 28, 1983, abandoned, which is a continuation of Ser. No. 195,422, Jun. 24, 1980, abandoned.

[30] Foreign Application Priority Data

Nov. 3, 1978 [DK] Denmark ............................ 4924/78
Jul. 13, 1979 [DK] Denmark ............................ 2976/79

[51] Int. Cl.⁵ .................................................. B32B 18/00
[52] U.S. Cl. .................................. 428/332; 106/725; 106/726; 106/737; 106/809; 106/816
[58] Field of Search ............... 106/725, 809, 726, 816, 106/737

[56] References Cited

U.S. PATENT DOCUMENTS

| 384,295 | 6/1888 | Stockwell | 264/122 |
|---|---|---|---|
| 1,082,684 | 12/1913 | Duryee | 106/98 |
| 2,141,569 | 12/1938 | Tucker et al. | 106/90 |
| 2,313,107 | 3/1943 | Wertz | 106/90 |
| 2,410,954 | 11/1946 | Sharp | 106/98 |
| 2,419,684 | 4/1947 | Johnson et al. | |
| 2,892,728 | 6/1959 | Jolly | |

(List continued on next page.)

FOREIGN PATENT DOCUMENTS 70703 12/1978 Australia .
0815925 10/1951 Fed. Rep. of Germany .
0825520 12/1951 Fed. Rep. of Germany .

(List continued on next page.)

OTHER PUBLICATIONS

Information Sheet, A/S Fesil & Co., Nov. 1978.
Nordisk Betong 6:1978, "Hydrophobic 3L Concrete, Attractive 'New' Structural Material" English Summary Only.

(List continued on next page.)

Primary Examiner—John J. Gallagher
Attorney, Agent, or Firm—Bryan Cave

[57] ABSTRACT

Shaped articles with a coherent matrix which comprises homogeneously arranged inorganic solid particles (A) of a size of from about 50 Å to about 0.5 micron, such as silica dust particles, and densely packed solid particles (B) having a size of the order of 0.5-100 micron and being at least one order of magnitude larger than the respective particles A, such as Portland cement particles, the particles A being homogeneously distributed, especially densely packed, in the void volume between the particles B, are made from an easily flowable composite material containing a very low amount of liquid and an extremely high amount of a dispersing agent, such as a concrete superplasticiser. Test specimens with Portland cement-silica dust-based matrices with dense packing of the silica dust have higher compressive strengths than hitherto reported, and reinforcements such as fibers or steel bars are subject to a high degree of fixation in the dense Portland cement-silica dust matrix because of the density of the matrix contacting the reinforcement such as illustrated in FIG. 5 which shows a plastic fiber incorporated in the dense matrix. Composite material for making shaped article comprises dispersing agent in sufficiently high amount to obtain a viscous to plastic consistency of the composite material with the small volume of liquid necessary to fill voids between particles A and B. The shaping of the composite material may be performed in a low stress field and without exchange of liquid with the surroundings.

37 Claims, 3 Drawing Sheets

U.S. PATENT DOCUMENTS

| | | | |
|---|---|---|---|
| 3,082,106 | 3/1963 | Ammann | 106/98 |
| 3,219,467 | 11/1965 | Redican et al. . | |
| 3,226,240 | 12/1965 | Crowley . | |
| 3,232,777 | 2/1966 | Bush | 106/90 |
| 3,277,162 | 10/1966 | Johnson | 106/90 |
| 3,313,638 | 4/1967 | Konrad . | |
| 3,489,582 | 1/1970 | Lindgren et al. | 106/97 |
| 3,489,583 | 1/1970 | Bloom et al. . | |
| 3,677,780 | 7/1972 | Nishi et al. | 106/90 |
| 3,754,954 | 8/1973 | Gabriel et al. | 106/97 |
| 3,802,894 | 4/1974 | Prost et al. . | |
| 3,880,664 | 4/1975 | Schulz | 106/99 |
| 3,957,520 | 5/1976 | Linton | 106/85 |
| 3,972,821 | 8/1976 | Weidenbenner et al. | 156/330 |
| 4,046,583 | 9/1977 | Collepardi | 106/90 |
| 4,088,808 | 5/1978 | Cornwell et al. | 428/409 |
| 4,102,695 | 7/1978 | Clauerie . | |
| 4,105,459 | 8/1978 | Mehta | 106/98 |
| 4,111,711 | 9/1978 | Kiehl et al. | 106/98 |
| 4,118,242 | 10/1978 | Kjohl et al. | 106/98 |
| 4,255,195 | 3/1981 | Holter et al. | 106/18.12 |
| 4,505,753 | 3/1985 | Scheetz et al. | 106/98 |
| 4,921,537 | 5/1990 | Horiguchi et al. | 106/725 |

FOREIGN PATENT DOCUMENTS

| | | |
|---|---|---|
| 1149290 | 12/1963 | Fed. Rep. of Germany . |
| 1181397 | 11/1964 | Fed. Rep. of Germany . |
| 1671078 | 10/1971 | Fed. Rep. of Germany . |
| 2219478 | 11/1972 | Fed. Rep. of Germany . |
| 2229094 | 1/1973 | Fed. Rep. of Germany . |
| 2256056 | 6/1974 | Fed. Rep. of Germany . |
| 2254146 | 1/1975 | Fed. Rep. of Germany . |
| 2620224 | 12/1976 | Fed. Rep. of Germany . |
| 2813559 | 10/1978 | Fed. Rep. of Germany . |
| 2818652 | 11/1978 | Fed. Rep. of Germany . |
| 2730943 | 5/1979 | Fed. Rep. of Germany . |
| 2558184 | 10/1980 | Fed. Rep. of Germany . |
| 2166399 | 8/1873 | France . |
| 0752994 | 10/1933 | France . |
| 1284816 | 1/1962 | France . |
| 1348764 | 12/1963 | France . |
| 2059789 | 6/1971 | France . |
| 2062039 | 6/1971 | France . |
| 2107015 | 5/1972 | France . |
| 2265702 | 10/1975 | France . |
| 2359090 | 7/1983 | France . |
| 49-125428 | 11/1974 | Japan . |
| 67201 | 12/1913 | Switzerland . |
| 548960 | 5/1974 | Switzerland . |
| 574880 | 3/1976 | Switzerland . |
| 1066787 | 4/1967 | United Kingdom . |
| 1144024 | 3/1969 | United Kingdom . |
| 1495811 | 12/1977 | United Kingdom . |

OTHER PUBLICATIONS

Nordisk Betong 5:1978, p. 18, "Use of Flow Additives" (Anvanding AV Flyttillsatser) English Summary Only.
Nordisk Betong 4:1978 English Summary Only.
Nordisk Betong 4:1977, pp. 19-22 English Summary Only.
A. Markestad, "An Investigation of Concrete in Regard to Permeability Problems and Factors Influencing the Results of Permeability Tests", Cement and Concrete Research Institute, the Norwegian Institute of Technology, Jun. 1977, pp. 1 and 163-180.
"Properties of Concrete"; AM Neville; p. 19.
"Cement and Concrete Terminology"; American Concrete Institute Committee Report; SP-19(85).
Vivian, Effect of Particle Size on the Properties of Cement Paste, Symposium on Structure of Portland Cement Paste and Concrete, Washington, D.C. 1966, pp. 18-24.
Bache, The Processing of Fresh Concrete, Rilem Seminar on Fresh Concrete, Sep. 1973, pp. 1-67.
Hylen and Bache, "Flydebeton", Dansk Betonforening, Oct. 1978 pp. 5-34 (Translation of pp. 29-33).
Hattori, Experiences with Mighty Superplasticizer in Japan, Superplasticizers in Concrete Symposium Ottawa, Canada May 29-31 1978, pp. 49-86.
Bache and Eriksen, High Strength Concrete with Superplasticizing Additives, Nordic Concrete Research Congress, Aug. 21-23, 1978, Journal of the Nordic Concrete Federation, Mar. 1978, p. 54 (Translation).
Bache, Densified Cement/Ultra-Fine Particle-Based Materials, The Second International Conference on Superplasticizers in Concrete, Ottawa, Canada, Jun. 10-12 1981, pp. 1-31.

PORTLAND CEMENT  SILICA DUST

1000 A

SHAPED ARTICLE AND COMPOSITE MATERIAL AND METHOD FOR PRODUCING SAME

This is a continuation, of U.S. Application Ser. No. 880,332, filed Jun. 24, 1986,; which was a continuation of Ser. No. 470,628, filed Feb. 28, 1983; which was, in turn, a continuation of Ser. No. 195,422, filed Jun. 24, 1980; all of which applications are now abandoned.

The properties of materials having a coherent structure comprising fine solid particles or a coherent structure formed from such particles are mostly strongly dependent on the particle size and upon how densely and homogeneously the particles are packed. With increasing density and decreasing particle size, the mechanical strength, the resistance to chemical attacks, the frost resistance, and the hardness increase. The mechanical strength increases with increasing density and with decreasing particle size. However, in the shaping of an article by deformation of a powder mass, the finer the powder is, the more difficult is it to work with a high particle concentration, because surface force preventing that the particles slide relatively to each other, become the more important, the finer the powder is. This is especially pronounced for aqueous suspensions of Portland cement where the dissolved salts make it difficult to eliminate the surface forces. Therefore, it is normally not easy to arrange Portland cement particles in water in dense packing when the Portland cement particles are too fine.

For example, in binders based on Portland cement, the powder fineness has become established with a specific surface about 3000–5000 $cm^2/g$ (in rare cases up to 6000 $cm^2/g$), and the powder concentration in the aqueous suspension normally corresponds to a water/cement weight ratio of 0.7–0.4 (for very strong concrete down to 0.3). Cement which is substantially finer—and which should theoretically give better properties—is difficult to mix and cast, especially in pastes with high cement concentration, and very dense pastes (low water/cement-ratio) based on very coarse cements are not attractive because of the coarse structure and slow hydration.

One of the main aspects of the present invention is to improve powder-based binders (especially binders based on Portland cement) by adding powders which are one or more orders of size finer than the binder powder (to form basis for a homogeneous and dense particle packing and an extremely finely porous structure) and secure a very homogeneous particle arrangement and a high particle concentration (low water/cement-ratio) by adding large amounts of surface active dispersing agents.

This makes it possible, inter alia, to obtain binders which are considerably stronger, much denser, more durable and especially far better suitable for fixation of reinforcing bodies such as fibers and bars than the unmodified binders. Also, it becomes possible to shape articles comprising such binder matrices in a low stress field and without any exchange of material with the surroundings, such as appears from the explanation given below.

Figure 1:
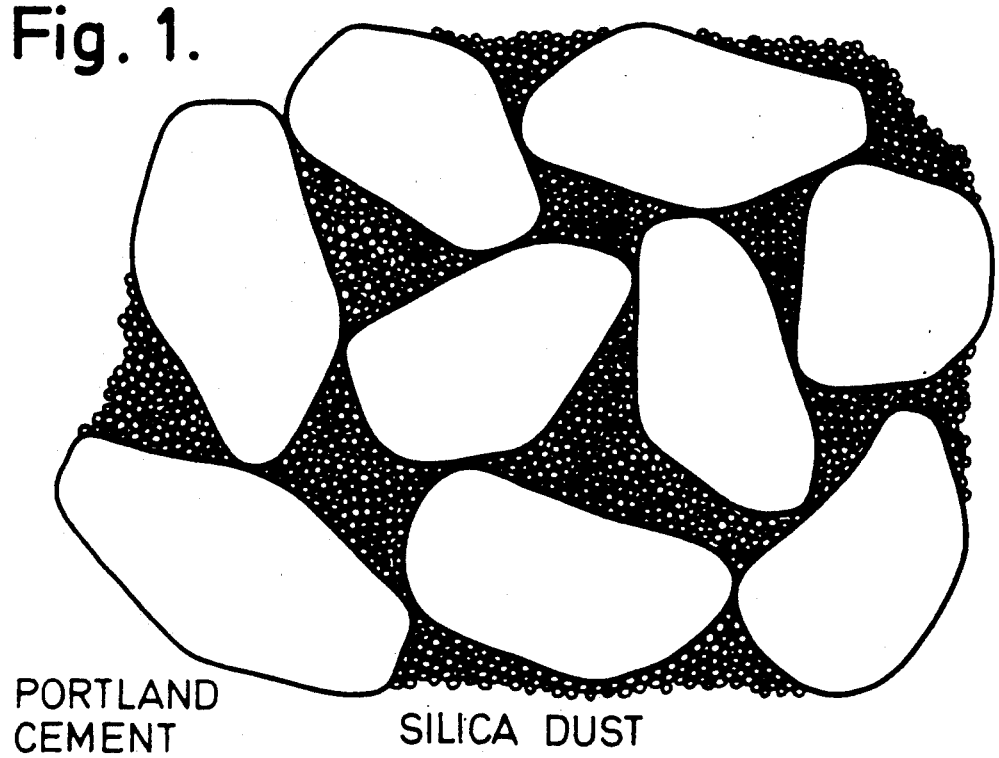
FIG. 1 is an exploded view of the dense packing of ultra-fine particles between the Portland cement particles.

In a very brief form, some basic principles of this invention could be said to be contained in the below four points:

1. The invention utilizes known particle geometry strategy on fine particle system which are 1–2 orders of magnitude (powers of 10) finer than the Portland cement-containing particle systems in which it has so far been possible to utilize the principles. In accordance with the invention, these principles are in particular used on aqueous suspensions of Portland cement and ultrafine particles which are 1 to 2 orders of magnitude smaller than the cement particles.

2. This has been obtained by a dosage of dispersing agents (1–4% by weight of a concrete superplasticiser dry matter calculated on the cement plus ultrafine particles) which is up to one order of magnitude higher than in the known art.

3. In the material of the invention, strength and durability are greatly increased. In addition to this, mechanical fixation of reinforcing bodies, e.g. fine incorporated fibers, is increased even more than the strength, the increase being one or several orders of magnitude. This is due to the fact that the dimensions of roughness and wave configuration on the reinforcing bodies which are necessary for obtaining "mechanical locking" of the reinforcing bodies in the matrix, are lowered by 1–2 orders of magnitude. This opens up the possibility of "mechanical locking" of fibers which are one to two orders of magnitude finer than hitherto.

4. The materials according to the invention may be shaped from a mass with plastic to low viscous consistency by simple shear deformation without any exchange of material with the surroundings, which means that no liquid will be or has to be moved or squeezed out of the mass during the formation of the dense structure. This makes it possible to prepare high quality products of much more complicated shape and larger size than hitherto—and makes it possible to obtain anchoring of components, especially reinforcing bodies of any kind which could not satisfactorily (or which could not at all) be introduced in corresponding high quality matrices prepared in the traditional manner. This aspect of the invention also opens up the possibility of new and more advantageous production techniques for known articles.

Hence, the invention is based upon the discovery of the possiblity of obtaining dense or homogeneous packing in these extremely small particle systems, in particular in a "gentle" way in contrast to the known art high pressure powder compaction techniques which, for Portland cement-based systems, constituted the only possible methods of obtaining such structures, and this opens up a wide range of novel products and processes within not only the cement field, but also many other related or unrelated fields such as ceramics and powder metallurgy.

Novel products which have become obtainable through the present invention may be defined as shaped articles comprising a coherent matrix, the matrix comprising A) homogeneously arranged inorganic solid particles of a size of from about 50 Å to about 0.5 μ, or a coherent structure formed from such homogeneously arranged particles, and B) densely packed solid particles having a size of the order of 0.5–100μ and being at least one order of magnitude larger than the respective particles stated under A), or a coherent structure formed from such densely packed particles, the particles A) or the coherent structure formed therefrom being homogeneously distributed in the void volume between the particles B), the dense packing being substantially a packing corresponding to the one obtainable by gentle mechanical influence on a system of geometrically equally shaped large particles in which locking surface forces do not have any significant effect, and optionally C) additional bodies which have at least one dimension which is at least one order of magnitude larger than the particles A), with certain provisos which will be explained below.

Throughout this specification, the term "particles A" designates inorganic solid particles of a size of from about 50 Å to about 0.5μ, and the term "particles B" designates solid particles having a size of the order of 0.5–100μ and being at least one order of magnitude larger than the respective particles A. The term "shaped article" designates any shaped structure comprising a matrix as defined above and includes such special kinds of articles as, e.g., road surface layers, fissure fillings, coatings on tubes, etc., which may not always be associated with the term "article".

Dense packing dominated by the geometry of the particles (without influence from surface forces) has been treated worldwide in the literature dealing with particulate technology in various fields, for example in "Particulate Technology, Clyde Orr, Jr. 1966, The MacMillan Company, New York, and "Principles of Particulate Mechanics", Brown and Richards, 1970, Pergamon Press. It is characteristic that packing of particle systems in which surface forces are insignificant is independent of the absolute particle size and depends only on the shape of the particles, the relative size distribution, and the mechanical way in which the particles are placed. This means that regular packing of equal spheres results in the same volume fraction of solids content (for example, 0.52 for cubic packing and 0.74 for hexagonal packing) irrespective of the absolute size of the spheres. The density of the packing is strongly influenced by the relative particle size distribution, that is, the ratio between the various particle sizes. Thus, Brown and Richards (loc.cit.) report classical experiments with binary packings of spherical particles with various size ratios where the volume fraction of solids content increases from about 0.63 for packing of each of the individual particle size fractions to 0.70 for a mixture of large and small particles with a size ratio of 3.4:1 and to 0.84 for a mixture of large and small particles in a size ratio of 16:1. The density of the packing is also strongly influenced by the mechanical compaction method. Simple pressure compaction will normally not lead to very dense packing of particle systems in which the particles retain their geometric identity (that is, are not crushed or heavily deformed). Normally, denser packing is obtained by shear deformation, repeated shear deformation, or balanced vibration, all with application of a small normal pressure to secure that the repeated deformation finally results in a more dense structure. For this reason, it is not possible to state dense packing in terms of one unique quantity. The "dense packing" referred to in the present specification is to be understood as substantially such a dense packing which would be obtained in systems without locking surfaces by influences of the above types such as shear deformation and balanced vibration. (Even such dense packing is not completely ideal; ideality would necessitate individual placing of each particle.)

The substantially coherent structure of the matrix of the above-defined defined articles of the invention may be due to the homogeneously arranged or densely packed particles A being combined with each other to form a coherent structure, or due to solid particles B as stated above being combined with each other to form a substantially coherent structure, or both the ultra fine particles A and the particles B in the shaped articles may each be combined with each other to form coherent structures, and/or particles A being combined with particles B to form the coherent structure. The combination between the particles A or between the particles B or between particles A and/or particles B may be of any character which results in a coherent structure. In systems comprising cement particles as particles B and silica dust particles (as defined below) as particles A the coherent structure is formed due to partial dissolution of the solid particles in the aqueous suspension from which the articles are made, chemical reaction in the solution, and precipitation of the reaction product, the silica dust being less reactive in this regard than the cement. In this connection it is noted that dependent on the identity of the particles A and B, also other mechanisms imparting coherence may have been responsible for the coherence of the matrix, such as melting or sintering, etc. The chemical reaction mentioned above may be one which takes place between the particles A or their dissolved constituents, or between the particles B or their dissolved constituents, or between particles A and B or between constituents of particles A and particles B.

Shaped articles comprising a matrix having a substantially coherent structure comprising homogeneously arranged or densely packed particles A together with densely packed particles of Portland cement were obtainable in the known art only by compaction in a high stress field, typically by high pressure powder compaction. Hence, one completely novel class of shaped articles of the invention comprises shaped articles produced by shaping in a low stress field of less than 5 kg/cm$^2$, preferably less than 100 g/cm$^2$, and having a matrix of a substantially coherent structure comprising homogeneously arranged or densely packed particles A or a coherent structure formed from such homogeneously arranged or densely packed particles A, and densely packed particles B, at least 20% by weight of the densely packed particles B being Portland cement particles, or a coherent structure formed from such densely packed particles B. Another way of defining the novel class of shaped articles of the invention with homogeneous arrangement of particles A between densely packed particles B of which at least 20% by weight are Portland cement particles is by referring to the dimensions of the article. Such articles having a correspondingly dense packing between the particles B and having at least one dimension of at least 1 m and a minimum cross section of at least 0.1 m² are not believed to have been made in practice, prior to the present invention, by high pressure powder compaction technique. Another way of expressing this kind of novel article which was only made possible through the present invention is by defining that the articles have a complex shape that does not permit its establishment through powder compaction. Finally, when the particles B have a molecular structure different from the particles A, such as will most often be the case in practice, such structures in which at least 20% by weight of particles B are Portland cement and which otherwise comply with the definition stated above are completely novel irrespective of the size or shape thereof. While it may have been possible in powder compaction techniques to obtain a combination of the two systems comprising homogeneously arranged or densely packed particles A and densely packed particles B, this would have involved crushing of the larger particles during the compaction process to result in the smaller particles and hence, would have meant that the larger particles and the smaller particles would have identical molecular structure.

One very interesting feature of this invention is that it is possible to establish structures of the types discussed above with inherently weak particles and inherently weak additional bodies which would have lost their geometric identity (would have been crushed or drastically deformed) by the known art treatment in a high stress field. This opens up the possibility of establishing dense structures with materials not previously available therefor. In most cases, the most valuable strength properties are obtainable when both particles A and particles B are densely packed. This situation is illustrated in FIG. 1 which shows the principles of the geometrical arrangement involving dense packing in fresh paste consisting of Portland cement particles and ultra fine particles between the Portland cement particles. With reference to tests made with mortar, fiber-reinforced paste and concrete based on this novel matrix, the Portland cement particles (average dimension 10μ) were arranged in a dense packing corresponding to a volume fraction of cement (volume of Portland cement divided by total volume) of 0.43–0.52. If ordinary cement paste—not containing ultra fine particles—had been arranged in the same dense packing, it would correspond to a water/cement weight ratio of 0.42 to 0.30. This would normally be claimed to be densely packed. In the new material according to the invention, it has been found possible to incorporate further up to 50% by volume of ultra fine solid particles in voids between the cement particles. The solid incorporated was fairly densely packed extremely fine spherical silica particles with an average diameter of 0.1μ and a specific surface of about 250,000 cm²/g. The total volume fraction of solid in the matrix of cement plus silica dust amounted to 0.64–0.70. The water/solid ratio (by weight) was 0.188 to 0.133.

The amount of silica dust to secure a dense packing of the silica dust particles depends on the grain size distribution of the silica dust and, to a large extent, on the void available between the densely packed particles B. Thus, a well-graded Portland cement containing additionally 30% of fine spherically shaped fly ash particles will leave a much smaller available void for the silica dust when densely packed than correspondingly densely packed cement in which the grains are of equal size. In systems in which the particles B are mainly Portland cement, dense packing of silica dust would most likely correspond to silica dust volumes from 15 to 50% by volume of particles A+particles B. Similar considerations apply to systems comprising other types of particles A and B. In the following specification and claims, the terms "ultra fine silica particles" or "silica dust" are intended to designate $SiO_2$-rich particles having a specific surface of about 50,000–2,000,000 cm²/g, especially about 250,000 cm²/g. Such a product is produced as a by-product in the production of silicium metal in electrical furnaces and comprises particles in a particle-size range from about 50 Å to about 0.5μ, typically in the range from about 200 Å to about 0.5μ.

The aspect of the invention involving dense packing of extremely fine powders has, for example, been realized in concrete (Example 1), mortar (Examples 3 and 9), and thin extruded panels with a reinforcement of plastic fibers (Example 2). In all of these cases, the binder matrix was prepared from Portland cement (specific surface about 2400–4400 cm²/g) and ultra fine spherical silica dust (specific surface 250,000 cm²/g) arranged in an extremely dense packing (water/powder weight ratio 0.18 and 0.13, respectively) by using, as dispersing agent, a concrete superplasticizer in an extremely high amount (1–4% by weight, in particular 2–3% by weight, of superplasticiser dry matter, calculated on the cement plus the silica dust).

The concrete was prepared from an easily flowable mass and had a high strength (the compressive strength of water-cured, wet cylindrical test specimens with diameter 10 cm and height 20 cm was 124.6 MPa after 28 days and 146.2 MPa after 169 days). The strength is 20% higher than the highest corresponding strength values reported for concrete made and cast in the normal way, including the use of superplasticising additives (vide Example 1). The compressive strength of mortar prepared from an easily flowable mass and cured in water for 4 days at about 60° C. was as high as 179 MPa, as assessed by tests on wet specimens having a diameter of 10 cm and a height of 20 cm (vide Example 9).

In accordance with this, Portland cement-based articles of the present invention can also be defined by referring to the uniquely increased compressive strength of their matrix in comparison with known art. Expressed in this way, by means of compressive strength values which are reasonable in view of the experiments reported in the Examples, the invention relates to a shaped article comprising a matrix which comprises a Portland cement-based binder and optionally added inorganic bodies of compact shape such as sand or stone, the matrix having a compressive strength of more than 130 MPa, measured on a test specimen having a diameter of 10 cm and a height of 20 cm, when the matrix is a concrete, as defined by the largest of the compact-shaped bodies being larger than 4 mm, 150 MPa, measured on a test specimen having a diameter of 3 cm and a height of 6 cm, when the matrix is a mortar, as defined by the largest of the additional compact-shaped bodies being between 4 mm and 0.1 mm, 200 MPa, measured on a test specimen having a diameter of 1 cm and a height of 2 cm, when the matrix is a paste, defined by the largest of the additional compact-shaped bodies being smaller than 0.1 mm, with the proviso that the shaped article has at least one dimension which is at least one meter and a cross section of at least 0.1 m², and/or has a complex shape which does not permit its establishment by powder compaction.

The production of a dense material where part of the particles B are weak particles retaining their geometric identity during the shaping process, rendered possible through the present invention, is of particular interest, for example, in the case where part of particles B consist of uncrushed fly ash from power plants, as such particles have a beneficial spherical shape; fly ash contains a substantial amount of weak hollow particles of the spherical shape which gives desirable flow properties of the casting mass, but which are likely to be crushed in traditional high pressure compaction. Mortar fabricated with gentle shaping according to the present invention and containing Portland cement, spherical power plant fly ash particles and silica dust is illustrated in Example 9. The compressive strength of the fly ash mortar was as high as 160 MPa.

Example 2 illustrates the production of plastic fiber-reinforced panels with the novel matrix. These panels showed an astonishing behaviour, in that, apart from being very strong (bending strength in tension about 25 MPa), they showed toughness which is a highly desirable property. The toughness is especially astonishing in view of the fact that the fibers were very short (6 mm polypropylene fibers) and the amount of fiber was moderate (2% by weight). That the very strong binder which is brittle per se was made tough with the above-mentioned reinforcement indicates that the material of the invention gives at least one order of magnitude better fixation of fine plastic fibers than ordinary cement matrices, and scanning electron microscopy investigations makes it likely that the new material behaves in this manner, as the new material appears extremely dense even at very high degrees of magnification. This appears from FIG. 5 which is a drawing made on the basis of a scanning electron microscopy photograph of a 30 $\mu$ thick polypropylene fiber anchored in a cement-silica matrix of the invention (vide Example 2). It will be noted that the matrix is extremely dense compared with ordinary cement matrices and is tightly packed against the fiber surface.

Hence, the very dense matrix obtainable with Portland cement and the ultra fine silica particles in dense packing shows unique capability of fixing fine fibers (fibers of cross-sectional dimensions of say, less than 50$\mu$), as it permits the establishment of a local wedging effect which is not present in ordinary cement paste, ordinary cement paste having a rather open structure in microscopic scale. The novel matrix also gives a considerably better fixation of coarser reinforcement, e.g. of steel in steel-reinforced concrete. This is illustrated in Example 10 in which the resistance to drawing out very smooth 6 mm steel bars cast into cement-silica mortar to a depth of 60 mm was 70% of the yield stress of the steel and the pull out work was 8-10 times the corresponding pull out work in a reference mortar having a compressive strength (38 MPa) of about one fourth to one fifth of the compressive strength of the mortar of the invention (179 MPa). Thus, in this experiment, the work of pulling out the smooth steel bars is increased relatively more than the compressive strength.

This opens up new aspects in the field of steel-reinforced concrete which will be discussed in greater detail below.

Dense packing of similar fine particle systems was known, for example in connection with colloidal silica used, for example, for coatings. It was also know to obtain very dense materials using such ultra fine materials together with materials of a fineness corresponding to Portland cement, but with a more favourable colloidal-physical behavior than Portland cement. Thus, it was known from British Patent No. 1,320,733, to produce hydraulic setting refractory compositions comprising hydraulic aluminous cement plus fine particles having a particle size less than 1 micron shaped by use of deflocculating agents to obtain good quality refractory compositions. These compositions were prepared using a relatively high ratio of water to cement plus fine powder (0.7-1.0), and the strength of the material prior to heating to 1350°-1600° C. was not particularly improved, the strength level obtained, 40 MPa, being low compared to the strength obtained according to the principles of the present invention. It was also known to produce such aluminous cement and MgO-based refractory compositions, but with much higher strength, by combining particles of aluminate cement and ultra fine particles arranged in a dense packing. Thus, U.S. Pat. No. 4,111,711 discloses the use of sodium tripolyphosphate as dispersing agent for producing a binder containing 25% by weight of aluminous slag of particle size 5-50$\mu$, 38% by weight of vitrious silica of a particle size from 100 Å to 0.1$\mu$, and 37% by weight of Fontainebleau sand of a particle size of 5$\mu$, the water/powder ratio being as low as 0.175. The mortar prepared from this mix showed a compressive strength after 20 days of 120 MPa (the testing conditions and specimen dimensions are not stated). However, it was not known to obtain corresponding dense structures in systems based on Portland cement, as the usual dipersing agents, for example sodium tripolyphosphate, are not effective in Portland cement-water-silica systems, such as it has been shown in a series of experiments described in the below Example 7. With the use of extraordinarily large doses of an efficient dispersing agent such as a concrete superplasticiser in accordance with the principles of the present invention, these difficulties have been overcome for Portland cement-silica-water systems, which makes it possible to utilize the above-mentioned principles concerning extremely dense or homogeneous packing of ultra fine particles and dense packing of particles being one order of magnitude larger in connection with all products which are nowadays produced from Portland cement-containing matrices such as reinforced concrete, fiber-reinforced concrete and mortar, fiber cement roofings such as asbestos cement roofings, coating panels, grouting mortars etc., and for production of articles which are nowadays made with more expensive materials such as steel, ceramic materials and plastics.

Furthermore, it has been found, in accordance with the present invention, that new technological advantages in connection with the shaping of articles and in connection with the reinforcement of articles are obtainable with the utilization of dense or homogeneous ultra fine particle systems of the type described above, and these discoveries apply not only to Portland cement-based materials, but quite generally to other dense systems, including the above-mentioned known dense systems for which such technological possibilities have not previously been reported. Hence, novel shaped articles provided through the present invention comprise not only articles containing Portland cement-based binder matrices. When additional bodies C which are not the sand or stone known from the above-mentioned U.S. Pat. No. 4,111,711 are present in the structures, the invention also comprises such articles even when containing binders which are not Portland cement-based. In the present context, the term "Portland cement-based" is intended to designate binder systems in which the particles B comprise at least 20% by weight of Portland cement particles. In addition, the improvements in the available shaping technologies obviating the use of any excess water, such as it will be discussed in greater detail below, opens up the possibility of more efficient and successful production of certain shaped articles for which it has not previously been anticipated to produce them with matrices of homogeneously arranged or densely packed ultra fine particle systems. In this connection, novel shaped articles of the present invention also comprise, irrespective of the chemical identity of the particles A and B, and irrespective of whether or not additional bodies C are present, such shaped articles as in situ cast oil well walls; duct fillings, such as in pre-stressed concrete; fissure fillings, such as in mining or engineering; sheets, panels and tiles of thin-wal;ed plane or corrugated shape, especially for use in or on buildings; protecting covers applied on steel and concrete members; pipes; tubes; electrically insulating members; nuclear shieldings; and containers, all of which novel articles may be produced with great advantages, both with respect to the production method and with respect to the properties of the final product, using the technologies which have been discovered in connection with the present invention.

With respect to the incorporation of ultra fine silica dust particles in cement-based binders, already an article from 1952 in "Betonen", No. 2, April 1952, volume 17 (issued by Norsk Cementforening), "SiO$_2$-st$\phi$v som cement-tilsaetninger", disclosed the use of up to 30% of silica dust of a fineness of 0.3$\mu$ in cement. A considerable increase of the strength of the concrete was noted on incorporation of this powder. However, a very high ratio between water and cement plus silica was used, that is, from 0.5 to 1, which means that neither the silica dust particles nor the cement particles were densely packed in the final structures, and the strength level was 53 MPa after 350 days, which is far lower than in the structures according to the present invention.

German Auslegeschrift No. 2,730,943 discloses the use of silica dust together with Portland cement of low aluminate content (an aluminate content of less than 5% by weight) as cement-bound matrices and states that the durability of such materials is increased due to the chemical reactivity of the silica. For example, the patent discloses a concrete with about 60 kg of silica dust of 300 kg of cement plus additives with a weight ratio between water and cement of 0.45, which corresponds to a water/(cement+silica) ratio of 0.38, and a 28 days' compressive strength of 85 MPa (as contrasted with a water/(cement+ultra fine particle) ratio of about 0.20–0.14 and a composite strength of at least 130 MPa for concrete and at least 150 MPa for mortar according to the present invention). The specification of the Auslegeschrift discloses the use of concrete superplasticiser in amounts, the upper limit of which could coincide with the above-mentioned extremely high addition thereof used in accordance with the present invention, but the Auslegeschrift does not specify any desirability of combining such high amounts of superplasticiser with the low water/(cement+ultra fine particle) ratios which are necessary to obtain the structures critical to the effects obtained through the present invention.

The additional bodies C having at least one dimension which is at least one order of magnitude larger than the particles A may, in principle, be bodies of a solid (such as discussed in greater detail below), a gas (such as in gas concrete), or a liquid. The bodies may be compact shaped bodies (such as sand, stone, gas bubbles, or liquid bubbles), plate-shaped (such as mica), or elongated (such as fibers or reinforcing bars or wires). Due to the possibility of shaping the articles in question in a "gentle" way in a low stress field, such bodies may, in contrast to what happens in any known art compaction processes which might achieve dense packing in ultra fine particle systems, substantially retain their geometric identity during the shaping. In this context, retainment of geometric identity indicates that the bodies in question ar not subjected to any substantial crushing or drastic deformation. A typical example is a solid body in the form of a hollow particle or a fiber which in powder compaction or other high stress field treatment would be crushed or drastically deformed, but which in the much lower stress field in which the articles of the invention may be formed is capable of avoiding such deterioration.

Examples of additional bodies C which are advantageously incorporated in the articles of the invention are sand, stone, polystyrene bodies, including polystyrene spheres, expanded clay, hollow glass bodies, including hollow glass spheres, expanded shale, perlite, natural lightweight aggregate, gas bubbles, metal bars, including steel bars, fibers, including metal fibers such as steel fibers, plastic fibers, glass fibers, Kevlar fibers, asbestos fibers, cellulose fibers, mineral fibers, high temperature fibers and whiskers, including inorganic nonmetallic whiskers such as graphite whiskers and Al$_2$O$_3$ whiskers and metallic whiskers such as iron whiskers, heavy weight components such as particles of baryte or lead or lead-containing mineral, and hydrogen-rich components such as hollow water-filled particles. When the articles of the invention comprise additional bodies C, it may be attractive for optimum strength and rigidity or for other purposes to obtain dense packing of the additional bodies. The easily deformable (easily flowable) matrix rendered possible through the present invention permits a considerably denser arrangement of additional bodies than was obtainable in the known art.

Especially the incorporation of fibers is of great interest due to the unique capability of the matrix with respect to anchoring fibers. In this context, it should be mentioned that the much denser structure in the articles of the invention will result in a virtual insulation of fibers otherwise subjected to chemical attack from the constituents of the matrix or from the surroundings. The fibers used in the articles of the invention may be of any configuration such as chopped single fibers, or continous fibers or yarns or ropes, or roving or staple fibers, or fiber nets or webs. The particular type and configuration of fiber will depend upon the particular field of use, the general principle being that the larger the dimensions of the shaped article, the longer and coarser are the fibers preferred.

The improvement of the fixation of fine fibers makes it possible to fabricate strongly improved fiber composite materials based on mixing, into the material, a larger amount of chopped fibers than in corresponding materials based on common matrices. To secure a good fiber performance in the known art matrices, it is necessary that the chopped fibers have a certain (high) length to diameter ratio, the so-called aspect ratio. In normal matrices it is, however, difficult to intermix and arrange fibers with large aspect ratios—in other words, the smaller the aspect ratio is, the easier it is to incorporate the fibers and arrange them in a suitable way in the cast matrix, and the higher volume of fibers can be incorporated. For example, chopped polypropylene fibers with cross dimensions of approximately 30μ, usually have a length of 12-25 mm (aspect ratio more than 500) when employed as reinforcement in ordinary cement matrices. A far better utilization of the same type of fibers is obtained in the matrix of the invention, such as described in Example 2. In Example 2, very favourable fixation and resulting strength properties were obtained even though the fiber length was only 6 mm. With the matrix of the invention it seems possible to reduce the length of chopped fibers and, hence, the aspect ratio, with a factor of 10 or more (compared to chopped fibers of ideal or reasonable aspect ratios for use in normal matrices) and, accordingly, to utilize this reduced aspect ratio to incorporate a larger amount of fibers in the composite material and/or secure a better fiber arrangement in the cast matrix.

The above-mentioned polypropylene fibers used in Example 2 can be characterized as polypropylene fibers having a tensile strength of at least 4000 kp/cm$^2$, a modulus of elasticity of at least $7 \times 10^4$ kg/cm$^2$, and an elongation at rupture of at the most 8%. Such fibers may be prepared by stretching a polypropylene film in a ratio of at least 1:15 to obtain a film thickness of 10-60μ and fibrillating the stretched material by means of a rotating needle or cutter roller to obtain fiber filaments of from about 2 to about 35 dtex. This technique is disclosed in German Patent Application No. P 28 19 794.6, and U.S. patent application Ser. No. 902,920 of May 4, 1978.

Among the most important articles of the invention are the ones in which the particles B comprise at least 50% by weight of Portland cement particles, especially the ones in which the particles B essentially consist of Portland cement particles. These very important kinds of shaped articles (the strength of which is illustrated in the examples) will typically contain silica dust particles in a volume which is about 5-50% by volume, in particular 10-30% by volume, of the total volume of the particles A and B and will typically contain sand and stone as additional bodies to form mortar or concrete of extremely high qualities with respect to mechanical strength, frost resistance, etc., and/or fibers, especially metal fibers, including steel fibers, mineral fibers, glass fibers, asbestos fibers, high temperature fibers, carbon fibers, and organic fibers, including plastic fibers, to provide fiber-reinforced products showing a unique anchoring of the fibers such as discussed further above. With particular reference to fibers which are subject to chemical deterioration, for example glass fibers which are subject to deterioration under highly alkaline conditions, it is an important advantage of the present invention that such fibers, both during the curing of the material and in the final cured material, become much better protected against influence from the environment, due to partial dissolution of the silica dust with resulting partial neutralization of the alkaline environment, and due to the micro-dense "jacketing" around the fibers conferred by the ultra fine particles and the coherent structure formed therefrom which very substantially contributes to static conditions in the glass fiber environment, substantially avoiding any migration of alkaline material against the fiber in the final cured matrix.

When the shaped articles of the invention are of large sizes, they are preferably reinforced with reinforcing steel such as bars or rods or steel wires or fibers. Reinforcements in pre-stressed constructions involving the matrix according to the invention are especially valuable. Due to the very gentle conditions under which the articles can be shaped, the reinforcement bodies can retain their geometric identity during the shaping process. A combination showing the matrix structure discussed above and reinforcing steel that had retained its geometric identity during the shaping process was hardly obtainable in the known art systems.

With the strongly increased strength of the binder matrix and the strongly improved fixation of fibers and bars in the matrix, possibilities for producing new classes of reinforced and fiber-reinforced cement based articles and materials are opened up:

1) Brittle materials with very high tensile strengths obtained by incorporating high quality fine fibers or whiskers (fibers or whiskers of high tensile strength and high modulus of elasticity, for example glass fibers, carbon fibers, asbestos, $Al_2O_3$ whiskers) in a medium to high volume concentration into the binder matrix.

2) Semi-brittle materials with high tensile strengths and comparatively large strain capacity obtained by incorporating high quality relatively fine fibers with high tensile strength and relatively low modulus of elasticity in a medium to high volume concentration into the binder matrix (for example, high strength polypropylene fibers and Kevlar fibers).

3) High performance pre-stressed reinforced articles, the quality being primarily obtained by incorporating a much higher volume of high quality steel bars or wires than ordinarily used (the volume of reinforcement that can be utilized being directly proportional to the compressive strength of the matrix) in a matrix of the new type according to the invention. In ordinary pre-stressed concrete, the volume of prestressing steel is as low as 1-2% of the concrete. The volume of the steel is limited by the compressive strength of the concrete. An increase of the compressive strength with a factor of 4 could, for example, be fully utilized in prestressing members to secure a 4 times higher bending capacity or to decrease the height of the member to one half. Such members would demand a not unrealistic high volume of pre-stressing steel (4-8%). It would also be possible to apply the improved matrix material in pre-stressed articles of much smaller cross section than in traditional pre-stressed concretes, with a corresponding use of finer pre-stressing reinforcement (thin wires). In spite of the larger specific surface, the wires are well-protected in the new dense matrix material which effectively shields the wires from any influence from the surroundings.

4) Articles of reinforced, not pre-stressed concrete where the improved quality of the matrix material is primarily utilized by incorporating steel bars or wires of a much higher tensile strength than in the ordinary steel reinforced concrete. The use of an increased amount of an ordinary reinforcement to benefit from the increased quality of the matrix would in many cases demand an unrealistically high amount of reinforcement. High quality reinforcement bars used in ordinary concrete have a surface which is shaped so as to secure their anchorage in the concrete (deformed bars; cam steel; tentor steel; etc.). Such bars have a strength not exceeding 900 MPa and, hence, do not have the same high strength as the best cold drawn smooth bars and wires used for example in pre-stressed concrete which typically have strength of 1800–2200 MPa. On the other hand, smooth wires and bars do not secure sufficient fixation in ordinary concrete. The strongly improved fixation obtained in the binder matrix according to the present invention opens up the possibility of a beneficial utilization of the very high strength smooth steel wires and bars as non-prestressed reinforcement. Due to large strain when fully utilizing the high steel quality and the corresponding cracks which will occur in the concrete (as in usual reinforced concrete) it is advisable especially to use the abovementioned technique in thin members in combination with fine reinforcement in order to secure a crack pattern with several finer distributed thin cracks.

The reinforcing possibility mentioned may, of course, be combined in many ways, for example by making a thin cover of semi-brittle reinforced material on a large load bearing member, or by use of high quality steel wires as secondary reinforcement (mainly placed perpendicular to the main reinforcement) in large pre-stressed members.

Due to its extreme tightness and mechanical strength, the material made possible by this invention is useful in a wide range of articles, examples of which are a sheet or panel of thin-walled plane or corrugated shape, such as sheets or panels of the same shapes as the known art asbestos cement products; a pipe; a refractory lining (e.g., applied as a complete lining) or a refractory lining component (such as a building stone for a refractory lining); a protecting cover (e.g. to protect other materials against chemical influences) such as a cheap protecting cover applied on steel, e.g. steel tubes or pipes, or on ordinary concrete products so as to supply concrete products with a noble surface which is strong, abrasion resistant, and acts as a sealant against influence from the surrounding environment, protecting covers on masonry, payements and roads, utilizing the same beneficial characteristics of the novel material, and protecting covers on roofing panels or tiles, or on containers; a roofing material such as a roofing panel or tile; an electrically-insulating member; a nuclear shielding for protection against radioactive action (for radioactive-based reactor constructions, etc.); a seafloor structure for deep water applications; a container; an in situ cast oil well wall; or a load-bearing member in structural engineering utilizing the extreme strength qualities of the material and its resistance to climatic influence, such as a beam, a shell, or a column, typically as reinforced concrete, especially as pre-stressed concrete. Seafloor structures for deep water applications, e.g. spherical containers to withstand large hydrostatic pressures require concretes of a high strength, high durability and low permeability.

"Polymers in concrete", ACI Publication SP-40-1973, P 119–148, report model tests on small 16 inches diameter spherical hulls made of high quality polymer-impregnated concrete for deep water applications. Full impregnation was obtained by a complicated drying-vacuum outgassing-pressure procedure which is, in practice, limited to small size members. With the materials and processes according to the present invention, it is now possible to produce such structures in large scale (several meters in diameter) with a similar high quality material by a simple fabrication technique.

While dense packing in the ultra fine particle system has been discussed to some extent above, it has also, according to the present invention, been found that extremely good strength properties are obtainable with densely packed Portland cement particles and ultra fine particles of silica dust homogeneously arranged in the voids between the cement particles, but in a smaller amount than corresponding to dense packing. Such a system comprising densely packed Portland cement particles or Portland cement plus additional particles of similar size and homogeneously arranged ultra fine particles in the voids between the densely packed particles is believed to be novel per se and has been found to be obtainable by means of the new technology herein disclosed and involving, inter alia, the use of extreme amounts of dispersing agent, vide Example 5 in which excellent mechanical strength properties has been obtained in systems where the ultra fine particles were present in homogeneous distribution in a densely packed cement matrix, but in an amount smaller than corresponding to dense packing of the ultra fine particles. In the present context, the invention comprises systems in which the amount of homogeneously arranged ultra fine silica dust is as low as down to 0.1% by weight, as even small amounts of well distributed silica has a beneficial effect which manifests itself in a high slope of the strength/silica dust content curve at low silica content. The condition for obtainment of this effect with these very small silica dust amounts is that the system from which the structure is made is superplasticised, that is, contains a dispersing agent which makes the mass easily flowable in a low stress field of less than 5 kg/cm$^2$, preferably less than 100 g/cm$^2$. While it was known to produce certain dense materials with ultra fine particles (silica dust) and powder of cement fineness, but with less problematic colloidal behavior than a Portland cement, vide the above-mentioned U.S. Pat. No. 4,111,711, it was not known to utilize the improved properties of these materials to obtain various very important technological advances such as, e.g. an improved fixation of fibers, a better shaping of a very dense high porous material (cell concrete), or for pre-stressed constructions, etc.

In addition to this, other aspects of the invention comprise methods which permit either the production of articles which could not be prepared in the known art, and methods which permit the preparation of articles of known structure in an easier way than according to the known methods.

By introducing ultra fine particles in the voids between densely packed particles, for example silica particles having a specific surface area of 250,000 cm$^2$/g in the voids between cement particles having a diameter of about 5$\mu$, a structure is obtained which shows an increased resistance against internal mass transport in the form of fluid transport (gas or liquid) between the particles and against mass diffusion in the pore liquid.

In connecting with shaping of cement-silica-water suspensions, internal liquid transport in the fresh material is of decisive importance. The resistance against viscous flow in systems of particles of geometrical similarity varies inversely as the square of the particle diameter.

This means that the time for a given liquid transport under a given pressure gradient in two geometrically similar particle-liquid systems with a particle size ratio of 1:50 is 2500 times higher in the fine grained system than in the system with particles which are 50 times as large.

A similar effect is obtained by filling the pore volume between large particles with ultra fine particles, as it is the cross-section dimensions of the resulting channels between the particles which are mainly responsible for the resistance to the flow.

These facts are well-known, and it is also known art to reduce the internal liquid transport in cement/water systems by introducing so-called "thickeners" in the water in the form of ultra fine particles or polymers such as Methocell.

Because of the dominating effect of locking surface forces, it will, however, normally not be possible to combine the uses of 1) very dense cement packing and 2) ultra fine particles in an easily flowable aqueous suspension.

However, with an extremely high dosage of a dispersing agent, such as a superplasticiser, this is possible. Thus, easily flowable cement paste, mortar and concrete with densely packed cement particles and containing 10–30 per cent by volume of silica dust, calculated on cement+silica dust, with water/cement+silica-ratio of 0.15–0.20 by weight can be made.

This results in several advantages compared to the known methods:

1. Production of superfluidized cement product without bleeding

In the known art production of high quality concrete and mortar using relatively high dosages of superplasticiser, an easily flowable mass having a low water/cement-ratio (for example 0.25) is obtained. The mass is poured into moulds where it is compacted under the influence of gravity and optionally also mechanical vibration. However, during this process, the heavier cement, sand, and stone particles will tend to arrange themselves in an even more dense packing, while water migrates upwardly, the so-called bleeding.

Accordingly, for such known systems with very efficient cement dispersion obtained in the use of relatively high dosages of superplasticiser, a marked bleeding is normally observed in spite of the low water/cement-ratio—especially if the process is accompanied by vibration. This phenomenon may for example be critical in the casting of concrete roads with superplasticised concrete as bleeding results in a surface sludge of high water content, and hence results in a road surface which has a lower quality than the intended abrasion layer. Internal liquid separation is also critical in casting of reinforced concrete with superplasticiser. The liquid separation may result in a bleeding at the underside of the reinforcement, which reduces the fixation of the reinforcement and reduces the protection against chemical attacks.

By introducing, in accordance with the principles of the present invention, ultra fine particles, for example 5–15% of silica dust having the above-mentioned particle size, between the densely packed cement particles, and using a high dosage of superplasticiser, a drastic delay of the bleeding process is obtained, theoretically corresponding to 100–1000 times slower water movement. In practice, this means that bleeding has been obviated, considering that the chemical structuring process normally starts and develops must faster.

In other words, utilizing the above-mentioned principle of the invention of combining high dosage of superplasticiser with silica dust, it becomes possible in practice to produce superfluidized high quality contrete, mortar and cement paste without bleeding. This is of special interest in connection with pre-stressed constructions, where the above-mentioned principles can be utilized for producing high quality non-bleeding, easily flowing injection mortar (grouting mortar) which gives extremely good protection of the tendons and secures an extremely good mechanical fixation, vide the more detailed discussion of this aspect below.

2. Production of high quality cement products in a low stress field and without liquid transport to the surroundings.

In the production of certain cement products, for example asbestos cement panels, the known art technique presently used is either a slip-casting technique (in which surplus liquid is pressed out from an aqueous slurry through filters, cf. the Magnani process in which the pressing is established via a vacuum system) or a high pressure extrusion of a moist powder (where a traditional thickener (Methocell) has been added to obviate the otherwise hardly avoidable internal liquid transport at the outlet and the consequent blocking of the system by particle interlocking).

According to one aspect of the invention, it becomes possible to produce such materials in a low stress field by simple rolling processes or extrusion without liquid exchange with the surrounding when a high amount of superplasticiser is incorporated in the mass together with ultra fine particles.

While it might seem possible to employ similar rolling or extrusion processes with cement materials with high amount of superplasticiser incorporated, but without the concomitant use of ultra fine particles which is characteristic to this aspect of the present invention, such materials—although they could be made easily flowable with a low water/powder-ratio (but not quite as low as with ultra fine, well dispersed particles)—would, due to the large size of the cement particles, show a marked tendency to local water expulsion in the stressed zones, such as at the rollers or at the outlet in extrusion, with resulting blocking of the particles. This has been observed in practice in experiments with a laboratory extruder with superplasticised, fine grained cement and with superplasticised ordinary cement plus an additive of a fine filler which was finer than the cement, but considerably coarser than the above-mentioned ultra fine silica dust. In both cases, the material had a sandy performance and could not be extruded due to blocking. With an ultra fine silica powder incorporated in the superplasticised cement system in accordance with the principles of the present invention, such expulsion of water is delayed with a factor of the order of 100–1000 (as calculated from theoretical considerations). The appearance of the cement silica material containing a high amount of superplasticiser is toughly-viscous and cohesive during rolling, while corresponding superplasticised products without the ultra fine silica powder typically appear as friction materials with a tendency to local water expulsion with resulting particle blocking during rolling or extrusion.

3. Production of easily flowable materials with a high internal coherence

Easily flowable superplasticised cement materials containing ultra fine silica particles are one aspect of the present invention and show a much better internal coherence than corresponding superplasticised easily flowable cement materials without ultra fine silica particles. This is believed to be due to the fact that local liquid transport which contributes to separation, is drastically reduced in the materials with the ultra fine silica particles.

Many advantages are obtained in this manner. For example, the existing possibilities of producing underwater concrete by simply pouring the fresh concrete into the water are considerably improved.

The method is known per se and especially developed with superplasticising additives (without ultra fine powder). With ultra fine, well-dispersed silica powder in accordance with the principles of this invention, the process is now much more attractive and shows correspondingly extended potential fields of utility.

The resistance against internal liquid transport increases with the density of the packing of the ultra fine particles in the voids between the coarse particles. Thus, it is expected that fluidized powder materials consisting of well-dispersed Portland cement (s=4000 cm$^2$/g) and silica dust (s=250,000 cm$^2$/g) will show considerably better internal coherence, higher resistance to internal liquid flow and bleeding, and better processability in rolling and extrusion with 20-40 volume per cent of silica dust than at 5-10 per cent. However, the experience so far obtained indicates that even very small amounts of ultra fine silica dust (typically 1-5%) incorporated between densely packed particles B), in particular in densely packed Portland cement structures may have a marked improving effect compared to similar materials without silica dust.

Other important aspects of the invention are duct and fissure fillings of cured grout.

Grout normally consists of cement and water, usually with admixtures to improve performance. The two main objectives in grouting ducts in post tensioned concrete members are to prevent corrosion of the tendons and to provide bond between the pre-tensioned steel and the concrete. The most important properties of the grout to be pumped in the ducts are fluidity and water retention (low bleeding).

Fluidity is essentially a function of the water/cement ratio. Reducing the water content produces a stiffer less fluid mix, the effect being more marked at lower water/cement ratios. In general, the water/cement ratio of good grout lies between 0.35 and 0.50. There are a number of additives such as dispersing agents which improve the fluidity for a given water/cement ratio, or alternatively, reduce the water/cement ratio required to obtain a given fluidity, but their effect on other properties of the grout, especially the bleeding, often limits their use.

Before grout sets, water can segregate from the mix due to the solid particles being heavier than the water—often termed "bleeding". This may inter alia result in highly undesirable water pockets at the underside of the pre-stressed steel. Bleeding is increased with increased water/cement ratio and with increased amount of dispersing agent (for example, a fluid cement paste having a water/cement ratio as low as 0.25, obtained with a high dosage of concrete superplasticiser, shows, in spite of the very low water/cement ratio, marked bleeding). Anti-bleed-additives are available which produce a thixotropic mix exhibiting virtually no bleeding. None of them, however, have hitherto been compatible with a combination of high fluidity and very low water/cement ratio. Furthermore, most of these additives are based on a cellulose ether which reduces the strength and retards the setting time. With grout according to the present invention, (for example a cement-silica-Mighty-grout having a water/cement plus silica dust ratio of 0.15-0.18), the following is obtained:

1) A much denser and stronger grout than hitherto having strongly improved fixation of the pre-stressing steel (probably corresponding to a factor of 4-10, cf. Example 10) and protection of the steel against corrosion, 2) the said grout being, in spite of the extremely low water/powder ratio, easily flowable and suitable for being pumped into and fill out the ducts with virtually no bleeding, the additives (ultra fine inorganic particles such as silica dust and a concrete superplasticiser) having no adverse effect on the setting of the grout, on the contrary, 3) resulting in a very high early strength.

Finally, the hydration shrinkage for cement paste with water/powder ratio 0.15-0.20 is considerably smaller than for pastes with water/cement ratios of 0.35-0.50. This means that the expanding additives which are frequently used in grouts to compensate for the shrinkage may not be necessary at all.

Normally, grout for injection in ducts in connection with poststressed concrete does not contain coarser particles (sand), as this would impede the flow of the mass. Grout according to the invention may, like conventional grout, be without any content of sand or any other additional bodies. However, the strongly improved coherence of the fluid mass of the invention with virtually no bleeding makes it possible to introduce sand into the grout thereby obtaining an even more rigid hardened structure, at the same time retaining an easily flowable grout. This has been demonstrated in an experiment (Example 11) where fluid coherent cement-silica-mortar containing sand up to 4 mm was easily poured into an about 2.5 meter long very narrow duct (18 mm diameter), mainly due to the action of gravity, thereby forming a very dense structure.

Along the very same line, the invention makes it possible to produce strongly improved prepacked concrete (where voids between the pre-placed stones are filled with a fluid mortar). The improvement obtained through the non-bleeding highly fluid mortar obtained according to the present invention may be utilized both in dry-casting and in sub-water-casting.

The invention also relates to a novel composite material for producing articles of the types discussed above, and shaped articles when made from such composite material. In one aspect, the composite material comprises A) inorganic particles of a size from about 50 Å to about 0.5μ, and B) solid particles having a size of the order of 0.5-100μ, and being at least one order of magnitude larger than the respective particles stated under A),
a liquid,
and a surface-active dispersing agent,
the amount of particles B substantially corresponding to dense packing thereof in the composite material with homogeneously packed particles A in the voids between particles B, the amount of liquid substantially corresponding to the amount necessary to fill out the voids between particles A and B, and the amount of dispersing agent being sufficient to impart to the composite material a fluid to plastic consistency in a low stress field of less than 5 kg/cm$^2$, preferably less than 100 g/cm$^2$,
and optionally C) additional bodies which have at least one dimension which is at least one order of magnitude larger than the particles A, with the proviso that when additional bodies C are not present or are present and consist of sand and/or stone, at least 20% by weight of the particles B are Portland cement particles.

It is to be noted that although the amount of surface active dispersing agent is defined above by stating the conditions which must be fulfilled in order that the amount be sufficient to disperse the particles in a low stress field (which, expressed in another way, indicates the use of an extremely high amount of the surface activity dispersing agent), this does not mean that the composite material is necessarily used in a low stress field; it may also be used in a higher stress field. Articles with densely packed superfine particles are obtained from a composite material of the above type where the particles A are present in a volume substantially corresponding to dense packing to fill the voids between the particles B when densely packed.

Figure 2:
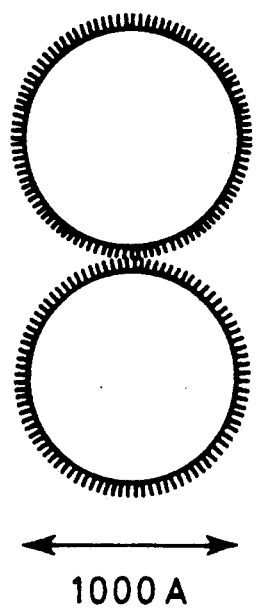
FIG. 2 shows the ultra-fine particles covered with a uniform layer of a dispersing agent in accordance with the present invention.

The surface-active dispersing agent is present in an amount sufficient to allow dense packing of the particles A) in a low stress field of less than 5 kg/cm$^2$, preferably less than 100 g/cm$^2$, and the ideal amount of the dispersing agent is one which substantially corresponds to the amount which will fully occupy the surface of the particles A. FIG. 2 shows ultra fine silica particles covered with a layer of a dispersing agent, a so-called superplasticiser "Mighty", the composition of which is described below. Under the assumption that the superplasticiser is absorbed in a uniform layer at the surface of the silica spheres, the calculated thickness, with reference to applicant's own experiments, was 25–41 Ångström, corresponding to a volume of 14–23% of the volume of the spheres. It is to be noted that a surplus of the dispersing agent over the amount which will fully occupy the surface of the ultra fine particles, will not be advantageous and will only tend to take up too much space in the composite material.

Any type of dispersing agent, in particular concrete superplasticiser, which in sufficient amount will disperse the system in a low stress field is useful for the purpose of the invention. The concrete superplasticiser type which has been used in the experiments described in the Examples to obtain the extremely valuable results in Portland cement-based systems is of the type comprising alkali and alkaline earth metal salts, in particular a sodium or calcium salt, of a highly condensed naphthalene sulfonic acid/formaldehyde condensate, of which typically more than 70% by weight consist of molecules containing 7 or more naphthalene nuclei. A commercial product of this type is called "Mighty" and is manufactured by Kao Soap Company, Ltd., Tokyo, Japan. In the Portland cement-based silica dust-containing composite materials according to the invention, this type of concrete superplasticiser is used in the high amount of 1–4% by weight, in particular 2–4% by weight, calculated on the total weight of the Portland cement and the silica dust.

Composite materials of this type will often contain additional fine particles of suitable size and size distribution together with the Portland cement particles, such as fine sand, fly ash, and fine chalk, to obtain even more dense binary structures formed from the particles B in accordance with the principles discussed above.

When the additional bodies C are not present, or are present, but consist of sand and/or stone, the composite material otherwise corresponding to the above-mentioned characterization might coincide with the very special dense composite materials known from U.S. Pat. No. 4,111,711 discussed further above and do not constitute part of the present invention. When, however, the composite material as defined above contains additional bodies which are not sand and/or stone, it is believed to be novel, and both with respect to its unique shaping and workability properties as discussed above and illustrated in greater detail in the examples below, and with respect to its capability of gently fixing and thereafter extremely effectively micro-locking or micro-jacketing, in the final shaped state, any incorporated additional bodies, it shows uniquely advantageous properties which have not previously been reported or indicated for any material, and hence, such novel and extremely useful composite materials constitute important aspects of the present invention.

Especially interesting novel composite materials of the invention are Portland cement-based or not Portland cement-based materials containing, as additional bodies, bodies selected from the group consisting of polystyrene bodies, including polystyrene spheres, expanded clay, hollow glass bodies, including hollow glass spheres, expanded shale, perlite, natural lightweight aggregate, gas bubbles, fibers, including metal fibers such as steel fibers, plastic fibers, glass fibers, Kevlar fibers, asbestos fibers, cellulose fibers, mineral fibers, high temperature fibers and whiskers, including inorganic nonmetallic whiskers such as graphite whiskers and $Al_2O_3$ whiskers and metallic whiskers such as iron whiskers, heavy weight components such as baryte or lead or lead-containing mineral, and hydrogen-rich components such as hollow water-filled particles. When the composite material is Portland cement-based, that is, contains at least 20% by weight of Portland cement particles as particles B, sand and/or stone as sole additional bodies will result in important novel mortar and concrete composite materials.

The most important composite materials of the present invention are the materials in which the particles A are silica dust particles having a specific surface area of about 50,000–2,000,000 cm$^2$/g, in particular about 250,000 cm$^2$/g, and the particles B comprise at least 50% by weight of Portland cement. In these composite materials, the dispersing agent is preferably a concrete superplasticiser in a high amount resulting in the above-defined dispersing effect. In accordance with the principles discussed above, the composite material for making the articles of the invention has a very low ratio between water and cement and any other particles B+silica dust, this ratio being 0.12 to 0.30 by weight, preferably 0.12 to 0.20 by weight, and the silica dust may be present in a volume which is about 0.1–50% by volume, preferably 5–50% by volume, in particular 10–30% by volume, of the total volume of the particles A+B.

In accordance with a special aspect of the invention, the composite material is packed and shipped as a dry powder, the addition of the liquid, typically water, being done on the job. In this case, the dispersing agent is present in dry state in the composite material. This type of composite material of the invention offers the advantage that it can be accurately weighed out and mixed by the producer, the end user just adding the prescribed amount of liquid and performing the remaining mixing in accordance with the prescription, e.g., in the manner described in Example II. This aspect of the invention can be characterized as a composite material for producing a shaped article (including such special shaped articles as duct fillings, etc., vide above), said composite material comprising A) inorganic particles of a size of from about 50 Å to about 0.5 $\mu$, and
B) solid particles having a size of the order of 0.5–100 $\mu$, and being at least one order of magnitude larger than the respective particles stated under A), and a surface-active dispersing agent, the amount of particles B substantially corresponding to dense packing thereof in the composite material with homogeneously packed particles A in the voids between particles B, and the amount of dispersing agent being sufficient to impart to the composite material a fluid to plastic consistency in a low stress field of less than 5 kg/cm$^2$, preferably less than 100 g/cm$^2$, when an amount of liquid substantially corresponding to the amount necessary to fill out the voids between particles A and B has been added and optionally C) additional bodies which have at least one dimension which is at least one order of magnitude larger than the particles A), with the proviso that when additional bodies C are not present or are present and consist of sand and/or stone, at least 20% by weight of the particles B are Portland cement particles.

The invention also relates to a process for producing a shaped article, said process comprising combining A) inorganic solid particles of a size of from about 50 Å to about 0.5 $\mu$, and
B) solid particles having a size of the order of 0.5–100 $\mu$ and being at least one order of magnitude larger than the respective particles stated under A),
a liquid,
and a surface-active dispersing agent, the amount of particles B substantially corresponding to dense packing thereof in the composite material with homogeneously packed particles A in the voids between particles B, the amount of liquid substantially corresponding to the amount necessary to fill out the voids between particles A and B, and the amount of dispersing agent being sufficient to impart to the composite material a fluid to plastic consistency in a low stress field of less than 5 kg/cm$^2$, preferably less than 100 g/cm$^2$, and mechanically mixing the above ingredients, optionally together with additional bodies C which have at least one dimension which is one order of magnitude larger than the particles A until a viscous to plastic mass comprising the particles A and B and optionally additional bodies C, has been obtained, and thereafter, if desired, combining the resulting mass with additional bodies C which have at least one dimension which is at least one order of magnitude larger than the particles A by mechanical means to obtain the desired distribution of such additional bodies C, and finally casting the resulting mass in the desired shape in a stress field, optionally with incorporation, during casting, of additional bodies C which have at least one dimension which is at least one order of magnitude larger than particles A, with the proviso that when additional bodies C are not incorporated or are incorporated and consist of sand or stone, the particles B comprise at least 20% by weight of Portland cement particles.

Also in connection with this process, the low stress field stated above defines the amount of dispersing agent to be used and does not necessarily mean that the process is in fact carried out in a low stress field. However, the fact that it can be performed in a low stress field constitutes one of the main advantages of the process, and preferred low stress fields (which are preferably below 5 kg/cm$^2$ and more preferably below 100 g/cm$^2$) used for shaping the mass are: gravity forces acting on the mass, such as self-levelling out of a cast soft mass, or forces of inertia acting on the mass, such as in centrifugal casting, or contact forces, such as pressure compaction, rolling or extrusion, or the simultaneous acting of two or more of the above forces, such as in combined vibration and pressure compaction. Also, oscillating forces with a frequency between 0.1 and 10$^6$ Hz may be used to shape the mass, the oscillating forces being of the type described above, such as forces from mechanical or hydraulic vibrator, or such oscillating forces may be combined with non-oscillating forces such as in combined vibration and pressure compaction.

For most practical purposes, the liquid used in the process is water, and the dispersing agent is often added together with the water so that an aqueous solution of the dispersing agent is added, but it is also within the scope of the present invention to incorporate the water separately from a solution of the dispersing agent, the dispersing agent being combined with the water in the mixing process. It is characteristic that a mixture conforming with the above-stated definition will have a very "dry" appearance during the mixing stage until it converts into a viscous plastic mass, this "dryness" being due to the low fluid content.

The fabrication technique for producing the shaped articles according to the invention must naturally be specially adapted to the specific type of composite material in question and the specific type of shaped article in question. There are, however, some general trends:

1) The powders of the matrix (particles A and B) should preferably be available as well dispersed as possible before intermixing. If the dispersion in dry condition is insufficient, e.g. if particles A are aggregated, some sort of dispersing action, such as grinding, may be applied.

2) The mixing must secure homogeneous mutual distribution of the solid particles A and B. This may be obtained by dry mixing or by wet mixing where a pre-mix of liquid and either particles A or particles B is mixed with the respective remaining particle type. This mixing step may be performed with or without additional bodies. In the Examples, which mainly deal with Portland cement-silica dust systems, the dry mixing technique was chosen. In the examples with concrete and mortar, sand and stone were incorporated in the dry mix.

3) Incorporation of the liquid either to the dry-mixed powder (particles A+B) or to either particles A or particles B in case of pre-mixing of a wet slurry as mentioned under 2) may be performed either by adding the powder to the liquid (preferably under strong mechanical stirring) or by adding liquid to the powder mass (preferably under strong mechanical kneading). Which of these methods to be used will largely be a question of experience. However, it is presently believed that in preparing a relatively easily flowing mass from well-dispersed powder, the most easy method is to perform the mixing by adding the well-dispersed powder to the stirred liquid, to avoid the liquid meniscus between particles which would occur in the reverse process in which small amounts of liquid were added to the powder. On the other hand, when poorly dispersed ultra fine powder is added to the stirred liquid, the powder may not be sufficiently dispersed by stresses introduced during stirring, even with addition of dispersing agent. In this case, incorporation of the liquid in the powder under high shear kneading is preferable as the kneading in combination with dispersing agents may achieve a considerable dispersing effect. In the Examples (which are mainly based on Portland cement+silica dust), the method of adding liquid to the powder under kneading-/mixing (with a rather modest shear stress of approximately 100–1000 g/cm$^2$) was applied. For the most fluid materials (mortar and concrete with water/(cement+silica) ratio of 0.18 to 0.20 by weight) it is believed that the reverse technique might have been used equally well. For the more stiff mixes (pastes for extrusion containing fibers and with a water/(cement+silica) ratio of 0.13 to 0.15 by weight) it is, however, believed that the reverse technique would not work at all; in these cases valuable part of the mixing occurred in the extruder where a relatively high kneading took place (in the range of 1 kg/cm$^2$).

4) The dispersing agent is not necessarily introduced as a solution in the liquid (it might be added as a powder to be dry mixed together with the particles A and B). For some systems, it is preferable to wet the surface of the particles with part of the liquid before adding the solution containing the dispersing agent, such as it is recommended in the known art with superplasticised Portland cement suspensions. This was also done in the cement-silica experiments described in the Examples, except in Example 11. It is worthwhile to note that the mixing time of the very dense wet mix may be drastically prolonged compared to traditional mixing. This was in particular the case for the relatively stiff mixes (extruded paste with water/(cement+silica dust) ratio of 0.13 to 0.15, cf. Example 2) and for the medium stiff mixes (water/(cement+silica dust) ratio of 0.15 to 0.16, cf. Examples 3 and 9 where a mixing time of approximately 15 and 5 minutes, respectively, was necessary for changing the consistency from an almost dry appearance to that of a dough and a fluid to viscous mass, respectively. For the concrete with a water/(cement+silica dust) ratio of 0.18, there was also a prolonged mixing time, but not as pronounced as for the very low water/powder ratio systems. It is believed that the local transport of the molecules of the dispersing agent to and between the surfaces of the densely packed solid particles is the time consuming factor of the process (this transport being more difficult, the smaller the ratio water/powder is). The consistency of the material is very sensitive to the amount of liquid. Thus, very small amounts of additional liquid may change the consistency from stiff dough-like to easily flowable. In a superplasticised cement-silica mixture, this change can be achieved by changing the water/(cement+silica dust) ratio from 0.14 to 0.18.

Introduction of the dispersing agent as a dry powder to the dry mix before adding water seems to be an equally valuable way of producing the casting mass of the invention. This was demonstrated in Example 11 where this procedure was used, resulting in a mortar with substantially the same flowability and appearance as one made from almost the same components, but mixed as described above with addition of the dispersing agent as a solution to the pre-wetted mix (vide Example 9, Mix No. 1).

For any specific system, there is a level at which the system is saturated with superplasticiser and above which there is no beneficial effect in adding further superplasticiser. This saturation point increases with decreasing water/(cement+silica dust) ratio. Above this level, the material is not sensitive to the amount of dispersing agent.

5) The incorporation of additional bodies C may be performed at any operational stage such as during the dry mixing or after wet mixing etc. The preferred technique to be used in the specific cases depends on the character of the additional bodies C and is a question of experience. In the case of concrete and mortar it is important to secure a relatively dense packing of the added sand and stone in order to secure a relatively small void to be filled with the dense binder matrix of the invention. When incorporating fine fibers, usual techniques such as shaking/mixing, paddle mixing, and kneading mixing may be applied. With incorporation of continuous fibers or filaments or pre-arranged fibers such as fiber nets or webs, according to known technique, a valuable fiber orientation or fiber arrangement is obtainable. Quite generally, the same techniques may be used for incorporating additional bodies in the matrix of the invention as for known matrices, but due to the substantial absence of locking surface forces between the particles, it will generally be easier to obtain efficient incorporation.

6) The casting, including compaction, may be obtained in the lowstress fields mentioned above. The new type of material will be well suited for transportation by pumping due to the substantial absence of bleeding, and the viscous character of the mass. As the casting mass, however, consists of a particulate matter with virtually no locking surface forces between the individual particles, vibration and especially high frequency vibration may strongly assist the casting, as the mutual oscillating displacement of adjacent particles will considerably facilitate the flowing.

7) The solidification of the material of the invention differs from solidification of the corresponding articles based on less densely packed matrices in two respects:

Firstly, as the structure is more densely packed, the solidification will be faster (early strength). Secondly, the solidification may be influenced by the rather large amount of dispersing agent which is necessary in order to obtain the specific structure. In the Portland cement-silica-Mighty systems, high early strength was obtained, but a modest retardation of the curing was noted (4–8 hours). In the actual Portland cement-silica-Mighty systems, it was shown, such as could be predicted from the expected calcium silicate hydrate structure to be formed, that extremely good quality could be obtained by curing at as well approximately 20° C., 80° C. and 200° C. (autoclave), which means that the novel matrix is useful for traditional low temperature curing, heat curing, and autoclave treatment. Heat curing (which in normal concrete leads to slightly smaller strength than curing at low temperature) seems probably to be the most promising curing technique for the material of the present invention.

In accordance with what has been stated above, the volume of liquid incorporated in the process is preferebly so that substantially no liquid escapes from the mass during the shaping process, which results in several advantages in comparison with known processes where liquid, typically water, is removed from the sludge during the shaping process, typically by some kind of filter pressing operation.

While the process of the invention can be said to constitute completely new technology, it can also be considered as a valuable modification of existing technology. For example in the preparation of fiber cement products according to the Magnani process, shaping (from a dilute cement/fiber/water slurry) through rolling is performed, with concomitant removal of water by suction. When incorporating ultra fine particles and the extremely high amounts of dispersing agents in the mass to be processed in accordance with the principles of the present invention, these known technologies can be modified to produce, by extrusion or rolling at a shaping pressure of up to 100 kg/cm$^2$, an (even more dense) material from a viscous/plastic mass which already shows the final low water content so that no water or substantially no water is removed from the mass during the shaping process, and hence, no suction arrangement is required.

As indicated above, additional bodies C may be incorporated at various stages during the process, and these additional bodies C are of the various types discussed in great detail in the preceding text, the only limitation being, or course, that some type of additional bodies such as reinforcing bars or tendons in prestressed concrete can only be incorporated during the casting stage and not in any previous stage.

Unique improved possibilities of submersed, in particular underwater construction comprise pouring a cement paste, mortar or concrete of the type of the present invention in the form of a coherent mass into a liquid, typically into water in the sea, a harbour or a lake, and allowing the mass to displace part of the liquid and arrange itself as a coherent mass.

Other possibilities of utilizing the extraordinary shapeability properties of the viscous to plastic mass are to shape articles by spraying, painting, or brushing to shape layers on other articles or to shape an article layer by layer, injection or simple hand application of a layer of the mass on a surface and conforming the mass to the shape of the surface. Centrifugal casting technique is another attractive shaping method useful in connection with the process of the invention.

It is known to increase the strength and improve the properties of finally porous materials by impregnation with a liquid which solidifies in the pores of the material.

Thus, it is known to impregnate hardened concrete with polymer plastic, and, thereby, to obtain considerably increased strength and durability. The polymerization of hardened concrete is performed by pressing or applying, through capillary suction, an easily flowable monomer into the pores of the concrete. Usually, monomers of the type methylmethacrylate or styrene are used, both of which have very low viscosity. Prior to starting the impregnation, the concrete must be dried out. When small articles are to be impregnated, they are immersed into a monomer bath, and the infiltration with the monomer is considerably improved by evacuating the article prior to the immersion, and an additional improvement of the impregnation is obtained by applying pressure to the liquid in which the article is immersed. Subsequent to the infiltration, the polymerization is performed by heating to about 80° C., for example in a water bath, or by irradiation. When impregnating by means of evacuation and subsequent application of superatmospheric pressure and subsequent polymerization, the compressive strength of usual concrete has been increased from about 30–40 to about 130–140 MPa. At less complete infiltration, that is, without application of vacuum and subsequent superatmospheric pressure, the improvement of the quality is considerably less.

It is also known to impregnate concrete and similar materials with other liquids. For example, experiments have been performed with application of liquid sulphur. Such impregnations with sulphur have been performed using similar impregnation techniques as mentioned above in connection with impregnation with polymers, and the results, with respect to the increase in strength, have been of about the same order as in the impregnation with plastics.

On the other hand, it is, of course, not known to impregnate the very dense, fine structures of the present invention. From theoretical fracture-mechanical considerations, it can be predicted that an additional filling out of pores with solid plastic or any other solid will give rise to a considerable increase in strength, even though the volume to be filled out is very small. In "Plastimpraegnerede betonmaterialer II" by Z. Fördös, A. Mikkelsen, K. Singer and A. Winther, March 1970, joint report from Risø and Betonforskningslaboratoriet Karlstrup, available from Aalborg Portland, P. O. Box 165, 9100 Aalborg, Denmark, is mentioned an increase in the strength of high strength high density diabas concrete prepared by oscillating high pressure compaction from about 100 MPa to more than 200 MPa by impregnation with polymethylmethacrylate and other polymers, even though the amount of polymer was as low as 2.2% by weight of the total body impregnated. In addition, it will, of course, also be possible to improve other properties of the novel materials through impregnation, for example abrasive strength and durability. In spite of the extreme density of the novel finely porous materials, impregnation is technically possible, such as it is partly theoretically predictable on the basis of the expected structure with internal ducts or pores between the original ultrafine particles A with cross section diameters of 25–100 Å, and partly experimentally proved in connection with the low temperature calorimetric experiments (discussed in Example 2) in which mercury was pressed into dried out sample under pressure in connection with the pores structure investigation, and in which other exsiccated samples were filled with water under pressure. Hence, one aspect of the present invention comprises the impregnation of the novel very dense structures, using the impregnation techniques discussed above, and the impregnated articles thus produced. The said impregnated articles are characterized in that they contain additional solid substance in the voids of the structure formed from the particles A and B. The additional solid substance is typically an organic polymer such as polymethylmethacrylate or polystyrene, a low-melting metal, or an inorganic metalloid such as sulphur.

In many cases, it is sufficient that the part of the matrix adjacent to exterior surfaces of the article comprises the additional solid substance, and this is also easier to obtain in practice than complete impregnation throughout the matrix.

The impregnation of the novel structures is performed in the manner known per se, that is, by partially or completely infiltrating a shaped article, comprising a dense matrix of any of the above-discussed types, with a liquid and thereafter solidifying the liquid. The liquid with which the infiltration is performed is preferably a liquid which shows at least one of the following characteristics:

It is capable of wetting the internal surface of the structure formed from the particles A and B, it contains molecules of a size which is at least one order of magnitude smaller than the particles A, on solidification by cooling or polymerisation, it leaves a solid substance of substantially the same volume as the liquid, In accordance with known art measures in the production of impregnated articles, the efficiency of the infiltration, and thereby, the efficiency of the impregnation, may be enhanced by drying or applying vacuum on the article or the part thereof to be impregnated, prior to the infiltration treatment, or by applying external pressure on the infiltration liquid after contacting the article with the infiltration liquid.

Hence, it will be understood that the present invention covers a wide range of potential fields of utility, from the case where incorporation of a relatively small amount of superfine particles and a sufficient amount of a dispersing agent results in a dramatic improvement of an existing technology with obtainment of the advantages stated above in connection with the explanation of the homogeneous distribution of the ultra fine particles, to the cases where dense packing is obtained between both the ultra fine particles and the particles B, to result in completely novel types of materials having unique properties.

When the ultra fine particles are to be densely packed in the structures according to the present invention, they are preferably of a size from 200 Å to about $0.5\mu$.

The ultra fine particles used in the Examples were $SiO_2$ particles formed from vapour phase (in connection with the production of silicium metal in an electric furnace). Other ultrafine $SiO_2$-containing particles may be used, such as particles prepared by other vapour phase processes such as combustion of silicon tetrachloride with natural gas to form hydrogen chloride and silicon dioxide vapour, or particles prepared as a sol by neutralizing sodium silicate with acid by dialysis, by electrodialysis, or by ion exchange. A list of commercial silica sols is given in R. K. Iler (in "Surface and Colloid Science", editor Egon Matijeviec, 1973, John Wiley & Sons): "Ludox", "Syton", "Nalcoag", "Nyacol", "Cab-O-Sil", "Syloid", "Santocel", "Aerosil", "Quso". Various ultra fine particles of other chemical composition are also contemplated, such as finely ground or dispersed natural clay, fly ash from power plants (the finest part of the fly ash), calcium carbonate, hydrated aluminum oxide, barium sulphate, titanium dioxide, zinc sulphate, and other fine particles, typically particles of the type used in the paint industry. There is, however, a preference for particles formed by growth from a vapour phase or liquid phase in contrast to particles formed by crushing of larger particles, because particles formed by growth from a vapour phase are likely to have a beneficial shape (spherical) in contrast to the irregular shape of crushed particles. Apart from this, it is normally technically difficult, if not impossible, to grind powder down to the ultra fine size, one $\mu$ (micron) often being considered as a rough lower limit for the grain size which can by obtained by grinding.

The invention is further illustrated in the Examples:
The materials used in the Examples were as follows:

| Portland cement: | Specific surface (Blaine) about 3300 $cm^2/g$ (Portland basis 5.78). Density 3.12 $g/cm^3$ |
|---|---|
| White Portland cement: | Specific surface (blaine) 4380 $cm^2/g$ Density (expected) 3.15 $g/cm^3$ |
| White Portland cement (ultra fine): | Specific surface (Blaine) 8745 $cm^2/g$ Density (expected) 3.15 $g/cm^3$ |
| E-Cement: | A special coarse Portland cement Specific surface (Blaine) about 2400 $cm^2/g$ |
| Aluminous cement SECAR 71: | Specific surface (Blaine) 3630 $cm^2/g$ Density 2.97 $g/cm^3$. |
| Silica dust: | Fine spherical $SiO_2$-rich dust. Specific surface (determined by BET technique) about 250,000 $cm^2/g$, corresponding to an average particle diameter of $0.1\mu$. Density 2.22 $g/cm^3$. |
| Fly ash from power plants (0007): | Fine spherical particles, part of which are hollow. Specific surface (Blaine) 5255 $cm^2/g$. Density approximately 2.4 $g/cm^2$ |
| MICRODAN 5: | Fine chalk (average diameter about $2\mu$, density 2.72 $g/cm^3$). |
| Quartz sand: | Density 2.63 $g/cm^3$. |
| Quartz sand, finely ground: | Specific surface (Blaine) 5016 $cm^2/g$ Density 2.65 $g/cm^3$ |
| Mighty: | A so-called concrete superplasticiser, sodium salt of a highly condensed naphthalene sulphonic acid/formaldehyde condensate, of which typically more than 70% consist of molecules containing 7 or more naphthalene nuclei. Density about 1.6 $g/cm^3$. Available either as a solid powder or as an aqueous solution (42% by weight of Mighty, 58% by weight of water) |
| Steel fibers: | Wirex-Stahlfaser, diameter 0.4 mm, length 25 mm. Density about 7.8 $g/cm^3$. |
| Water: | Common tap water. |
| Polypropylene fibers: | Fibers prepared as described in Example 4. |

EXAMPLE 1

Preparation of cylindrical concrete specimens from wet concrete mixed with silica dust/cement.

Concrete specimens were prepared from four 35 liter batches, each of the following composition.

|  | per batch (gram) | per $m^3$ (kg) | (liter) |
|---|---|---|---|
| Silica dust | 4.655 | 133 | 60.5 |
| Portland cement | 14.000 | 400 | 128.2 |
| Quartz sand (¼-1 mm) | 4.985 | 141 | 53.4 |
| Quartz sand (1-4 mm) | 19.810 | 566 | 214.4 |
| Crossed granite (8-16 mm) | 40.355 | 1153 | 427.0 |
| "Mighty" (powder) | 72.5 | 13.5 | 8.4 |
| Water | 3500 | 100 | 100 |

From each batch, 16 cylindrical concrete specimens (diameter 10 cm, height 20 cm) were cast.

Comments on the above composition:
To obtain a dense packing of the binder, about 32 per cent by volume of the fine powder (silica dust) and about 68 per cent by volume of the coarse powder (Portland cement) was used. In order to avoid dilution of the binder, relatively coarse sand without fines under ¼ mm was used. In the coarse materials gap grading was utilized (the composition does not contain any material between 4 and 8 mm), and the sand/course aggregate ratio was adapted in order to obtain a dense structure with minimum binder volume. In consideration of the dense packing, the amount of binder (Portland cement plus silica dust) was reasonably low (533 kg/m³). The dosage of "Mighty" permitted the obtainment of a very soft, easily cast concrete with low water content (water/powder ratio 0.19 per weight). (Later experiments have indicated that the amount of water may be kept considerably lower for concrete to be cast with traditional vibration technique, for example 80 liter/m³ instead of the 100 liter/m³ used in this Example).

The procedure was as follows:

Mixing: Coarse aggregate, sand, cement and silica dust were dry-mixed in a 50 liter paddle mixer for 5 minutes. Thereafter, part of the water (about 2000 grams of the total 3500 grams) was admixed, and mixing was continued for 5 minutes. Concomitantly with this, a solution of 472.5 grams of "Mighty" powder in 1000 grams of water was prepared by shaking for 5 minutes on a shaker mixer. The "Mighty" solution and the remaining about 500 grams of water were added to the mixture (the last water was used for washing the container containing the "Mighty" solution to ensure that the entire amount of "Mighty" was utilized).

Fresh concrete: The concrete was soft and easily workable. The consistency of the concrete was determined by measuring the spreading cone (DIN 1048 Ausbreit-Mass, 20 cm cone, diameter 13 cm–20 cm). The spreading measure was 27 cm–30 cm. On the first batch, the content of air was measured (1.5%).

Casting: 16 concrete cylinders having the dimension stated above were cast from each batch. The specimens were vibrated for 10–20 seconds on a vibrating table (50 Hz).

Curing: Immediately subsequent to casting, the closed molds were submersed in water. Some of the specimens were cured in water at 80° C., while other specimens were cured in a partially water-filled autoclave at 214° C. and a pressure of 20 atmospheres, and another portion of the specimens were cured in the normal way in water at 20° C.

Various curing times were used. The specimens cured in water at 20° C. were demolded after about 24 hours, and their density was determined by weighing in air and submersed in water, whereafter the specimens were again placed in the water for further curing.

The heat-cured specimens were removed from the water bath after 20 hours and cooled for about 1 hour in water at 20° C., whereafter they were demolded, and their density was determined by weighing in air and submersed in water, respectively. Part of the specimens were thereafter subjected to strength testing etc.

A single specimen was autoclaved for about 96 hours under the conditions stated above, whereafter it was cooled and demolded and weighed in air and submersed in water for determination of density, whereafter it was subjected to mechanical testing.

Testing

Density, sound velocity, dynamic modulus of elasticity, compressive strength and stress/strain curve were determined. The compressive strength was determined on a 500 tons hydraulic press.

In the table below, the strength values for the various curing times are stated.

TABLE I

Compressive strength measured on 10 φ × 20 cm water-cured concrete cylinders, cured and tested at 20° C.

| Curing time days | Compressive strength (MPa) | Number of specimens | Standard deviation (MPa) |
|---|---|---|---|
| 1 | 26.9 | 10 | 1.72 |
| 14 | 115.9 | 6 | 3.71 |
| 28 | 124.6 | 10 | 4.16 |
| 84 | 140.4 | 4 | 2.23 |
| 169 | 146.2 | 2 | 6.19 |

10 specimens water-cured at 80° C. for 20 hours were subjected to determination of compressive strength. The average compressive strength determined was 128 MPa.

One specimen autoclaved for about 96 hours at 214° C./20 atmospheres was found to have a compressive strength of 140 MPa.

The density of all samples was closely around 2500 kg/m³. Calculations showed that this density corresponds to a dense packing with low air content (probably below 1–2%).

For specimens water-cured at 20° C., the sound velocity was about 5.2 km/sec., and the dynamic modulus of elasticity was about 68,000 MPa.

Comments on the test results

The experiments and the test results show that the water requirement of the concrete with the new binder combination is very low (water/powder ratio 0.19 by weight), even though the concrete was easily flowable (had a high slump).

The mechanical properties of the cured material, especially the strength, was far better than for conventional "super concrete" cast with 600 kg of cement and superplasticising additives. To the applicant's best knowledge, the highest compressive strength of concrete fabricated with traditional casting and curing technique recorded until now is 120.6 MPa measured on test cylinders of the same dimensions as above and consisting of concrete with a water/cement ratio of 0.25, a cement content of 512 kg/m³, and a content of "Mighty" 150 in an amount of 2.75% of a 0.42% solution, calculated on the weight amount of cement, the samples having been stored for one year prior to the testing of compressive strength. (Kenichi Hattori, "Superplasticizers in Concrete, Vol. I, Proceedings of an international Symposium held in Ottawa, Canada, 29–31 May, 1978, edited by V. M. Malhhotra, E. E. Berry and T. A. Wheat, sponsored by Canada Centre for Mineral and Energy Technology, Department of Energy, Mines and Resources, Ottawa, Canada and American Concrete Institute, Detroit, U.S.A.).

EXAMPLE 2

Preparation of fiber-reinforced silica dust/cement specimens

Fiber-reinforced specimens were prepared with the following composition:

| | Experiment No. | | | |
|---|---|---|---|---|
| | 1 | 2 | 3 | |
| | (% by weight, dry basis) | | | |
| 6 mm polypropylene fibers | 2.2 | 3.0 | 3.0 | (140 g) |
| Silica dust | 23.8 | 23.6 | 24.5 | (1715 g) |
| E-Cement | 71.6 | 70.9 | 75.5 | (5145 g) |

-continued

|  | Experiment No. | | |
|---|---|---|---|
|  | 1 | 2 | 3 |
|  | (% by weight, dry basis) | | |
| Mighty | 2.4 | 2.4 | 2.7 (186 g) |
| Water/dry matter-ratio | 0.157 | 0.157 | 0.13 (water 910 ml) |

Experiments 1 and 2 were made using batches of about the same size as stated for Experiment 3. In a kneading machine with planetary movement, the cement plus the silica dust were dry mixed for 5 minutes with a mixing blade.

Thereafter, the major portion of the water which did not form part of the Mighty solution was added, and mixing was continued for 5 minutes with a mixing hook.

The Mighty solution and the remainder of the water (about 50 ml) were added, and mixing was continued with the mixing hook until a dough-like consistency had been obtained (8-15 minutes).

The fibers were added to the dough while mixing with the mixing hook, and thereafter, the mixing was continued for 5 minutes.

The resulting mass was extruded into strings with a cross-section of about 4×1 cm in a laboratory extruder at a pressure not exceeding 2 kg/cm$^2$.

Immediately subsequent to the extrusion, the material was covered with plastic film. About 1 hour later, the extruded strings, which had a length of 1-2 meters, were cut in lengths of about 20 cm and stored in a moist box at 20° C. for about 24 hours. Thereafter, they were subjected to various types of storing:

1) Storing in water at 20° C./or in 100% relative humidity at 20° C.
2) Storing at 100% relative humidity at 20° C.
3) Steam curing at 80° C. at 100% relative humidity for about 24 hours.
4) Autoclaving at 130° C. for about 48 hours for Experiments 1 and 2 and at 125° C. for 60 hours for Experiment 3.

TESTING

Most of the samples were tested in bending tests in which the curvature of the specimens was determined as a function of the load. A 4-point load with a support distance of 19 cm and a load distance of 10 cm was used. The testing machine was a deformation controlled machine, ZWICK 1474.

One speciment from Experiment 1 and one from Experiment 2 were tested in pure tension in the above machine. Force/deformation diagrams were recorded.

Rupture surfaces were subjected to scanning electron microscopy.

TEST RESULTS

In the below table, sigma$_M$ designates the formal maximum tensile stress in bending at which the matrix cracks (break in the stress/strain curve). Sigma$_E$ designates the formal maximum tensile stress at maximum load. E$_M$ is the modulus of elasticity before crack of the matrix. Sigma$_T$ designates the tensile strength.

TABLE II

|  | Experiment | | | | | | | |
|---|---|---|---|---|---|---|---|---|
|  | 1 | | | 2 | | | 3 | |
| Temperature, °C. | 20 | 80 | 130 | 20 | 80 | 130 | 20 | 125 |

TABLE II-continued

|  | Experiment | | | | | | | |
|---|---|---|---|---|---|---|---|---|
|  | 1 | | | 2 | | | 3 | |
| Relative humidity, % | 100 | 100 | aut.* | 100 | 100 | aut.* | water | aut.* |
| Days | 7 | 1 | 48 h. | 7 | 1 | 48 h. | 7 | 60 h. |
| Sigma$_M$ MPa | 9.8 | 12.0 | 22.7 | 10.2 | 14.0 | 18.7 | 13.6 | 26.4 |
| Sigma$_E$ MPa | 18.1 | 19.0 | 27.6 | 16.2 | 19.0 | 24.1 | 21.4 | 26.4 |
| E$_M$ GPa | 10.5 |  | 23.9 | 10.6 | 19.2 | 19.6 | 34.0 |  |

*autoclaving

Figure 3:
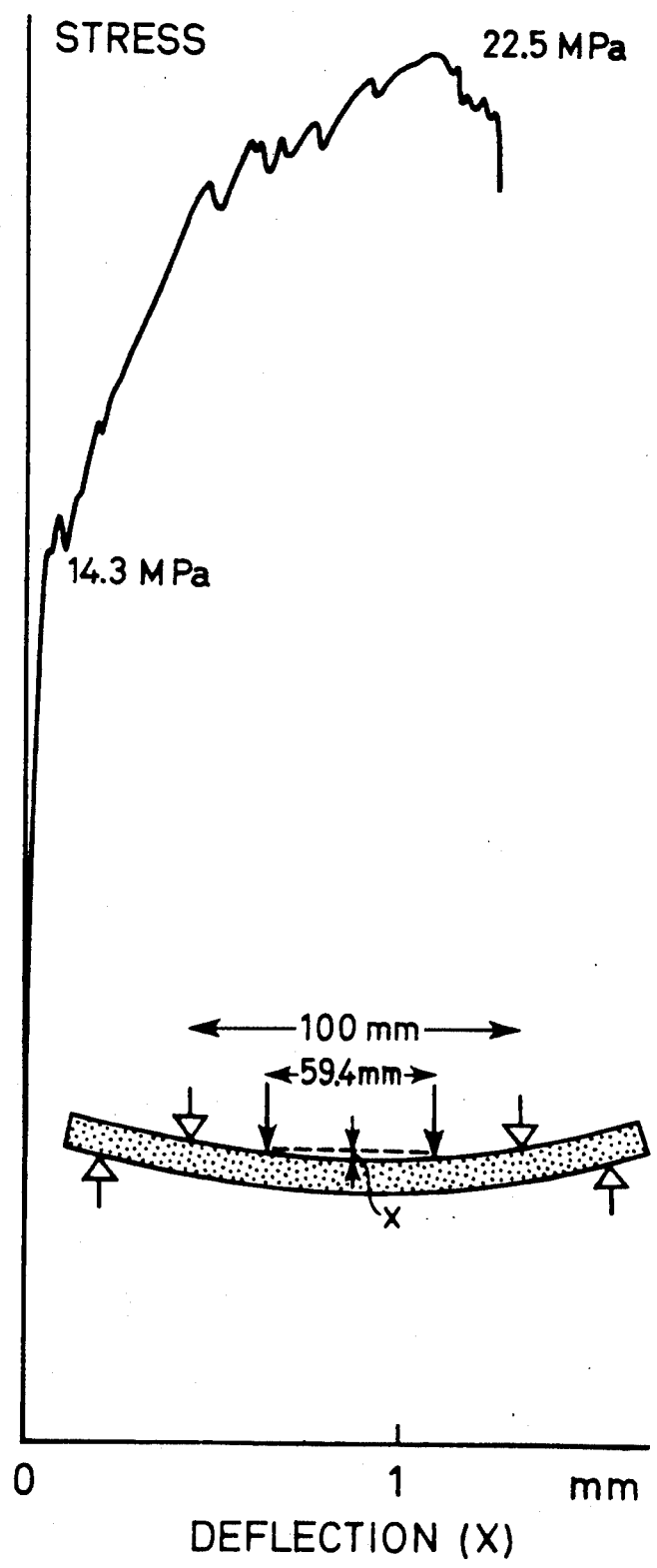
FIG. 3 shows a diagram of bending stress versus deflection of the specimens prepared in accordance with experiment 3.

FIG. 3 shows a diagram of bending stress versus deflection of one of the specimens from Experiment 3 cured at 20° C. for 7 days. Thickness 10.6 mm. As ordinate is shown the formal bending stress and as abscissa deflection. Until fracture of the matrix, the plate was very stiff. Hereafter, the load was largely carried by the fibers, and the specimen was able to carry an excess load of 57% while it was deflected 1 mm measured over a length of about 60 mm.

Figure 4:
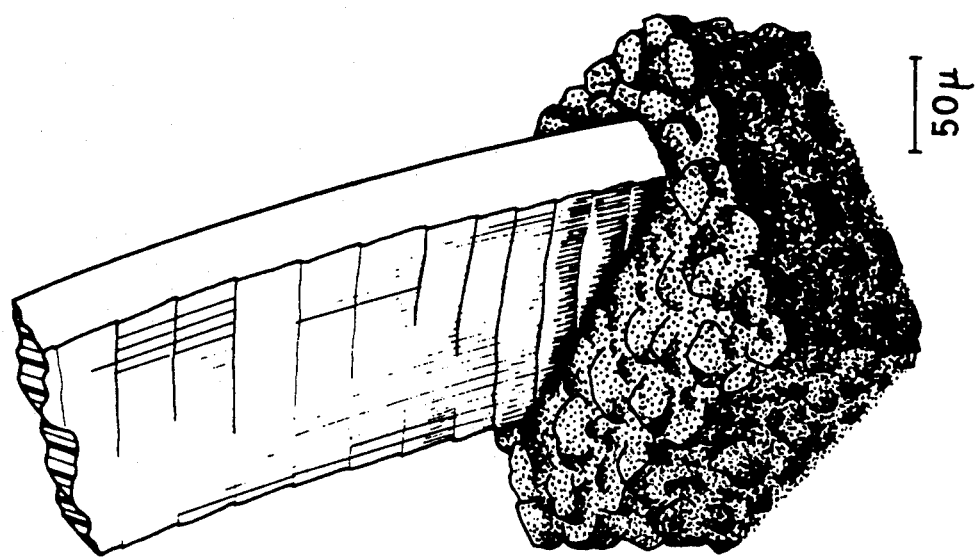
FIG. 4 is a stress/strain diagram for the specimens made in accordance with experiments 1 and 2.

FIG. 4 is a stress/strain diagram for the specimen made according to Experiment 1, cured at 80° C. for 1 day, and the specimen made according to Experiment 2, cured at 80° C. for 1 day, respectively, in tension. The material was very stiff until cracks occurred in the matrix. Hereafter, the load was carried by the fibers.

Figure 5:
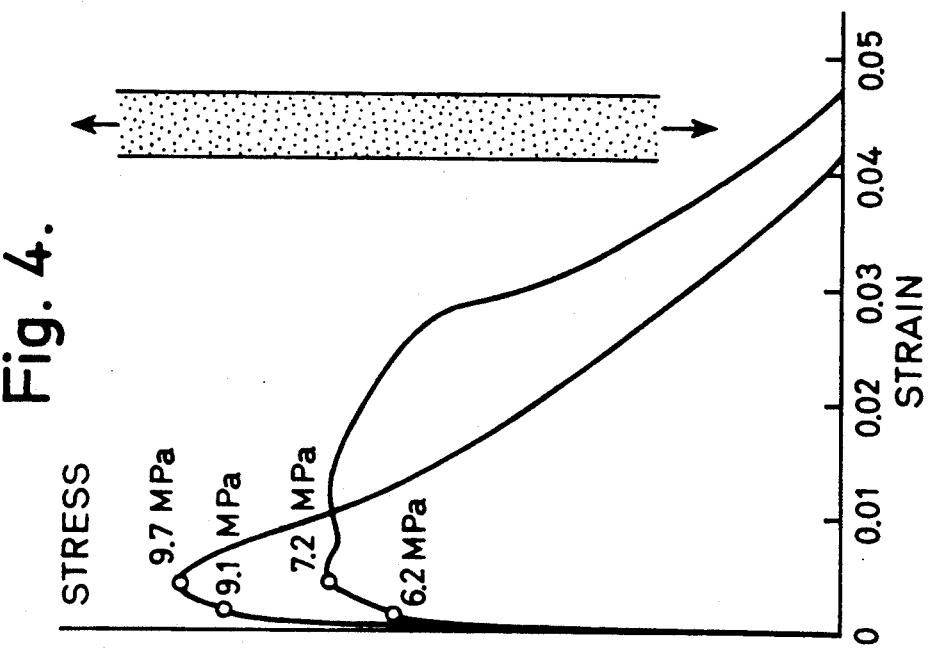
FIG. 5 is a graphic depiction of a scanning electron microscopy photograph of a polypropylene fiber at the rupture surface of a specimen made in accordance with the present invention.

FIG. 5 is a scanning electron microscopy photograph of a 30µ thick polypropylene fiber at rupture surface of one of the specimens.

One specimen from Experiment 3 cured at 20° C. for 7 days was further cured under substantially the same conditions for about 3 weeks and was thereafter subjected to a determination of the amount of freezable water.

The testing was performed by differential calorimetry, the specimen being cooled down to −50° C. Only very little freezable water was determined, viz. 5 mg per gram of specimen freezing at between −40° and −45° C. A material showing such properties must be designated as absolutely resistent to frost attack.

EXAMPLE 3

Experiments were made with various types of fine filler in order to determine the water demand necessary to obtain the fluid to plastic consistency of the mass to be cured. The following four series were performed:

1) Casting of cement mortar with silica dust.
2) Casting of cement mortar with the same volume (as the silica dust in 1)) of relatively fine chalk "Microdan 5" which is somewhat finer than the cement, but not nearly as fine as the silica dust.
3) Casting of cement mortar plus filler (same volume concentration as the fillers in 1) and 2)) of the same fineness of cement (as the filler is Portland cement proper (reference mixture)).
4) Casting of a similar mixture as in 1), but of a somewhat softer consistency, and including chopped steel fibers in a volume concentration from 1-5%.

In all of the series, the following common components were used (with reference to one batch; for series 4), batches of double size were used):

| Quartz sand: | 1-4 mm | 2763 g |
|---|---|---|
|  | 0.25-1 mm | 1380 g |
|  | 0-0.25 mm | 693 g |
| Portland cement: |  | 2706 g |
| Mighty (dry powder) |  | 107 g |

-continued

| The following components were different: | | |
|---|---|---|
| Series 1 | Filler: silica dust | 645 g |
| | water*) (total) | 444 g |
| Series 2 | Filler: Microdan 5 | 790 g |
| | water*) (total) | 620 g |
| Series 3 | Filler: Portland cement | 906 g |
| | water*) (total) | 720 g |
| Series 4 | Filler: silica dust | 645 g |
| (softer mortar | water*) (total) | 570 g |
| for fiber re- | steel fibers | 250-500-1000-1242 g |
| inforced tiles) | | |

*)The amount of water was determined with respect to obtainment of the same consistency in mixing and casting.

Mixing and Casting

The mixing was performed in a kneading machine with planetary movement, using a mixing blade. The following procedure was followed:

1) Dry mixing of sand, cement+filler for 5 minutes.
2) Addition of the major portion of the water which does not form part of the Mighty solution. About 50 ml of the water is kept for later use as rinsing water. Continued mixing for 5 minutes.
3) Addition of Mighty solution (mixed on shaking mixer 107 g of Mighty+215 g of water—or multipla hereof) with subsequent rinsing of the container with the above-mentioned 50 ml of water to secure that all of the Mighty is incorporated in the mixture. Mixing for about 10 minutes.

The mortar mixtures in Series 1, 2, and 3 behaved like a highly viscous fluid and were cast in cylindrical moulds on a standard vibrating table (50 Hz). The casting time was about 1 minute. The specimens (in closed moulds) were cured in water at 20° C. The mortar mixtures in Series 4 (double size) were considerably softer.

In Series 4, steel fibers were poured into the mixing vessel after curing the final mixing of the mortar. Four different dosages were used, that is, 1, 2, 4, and about 5% by volume, respectively. Mixing was continued for additionally 5 minutes, whereafter tiles of 5×30×40 cm were cast on vibrating table.

After curing for about 24 hours in the moulds (cylindrical and tile moulds), the specimens were taken out and their density was determined by weighing in air and submersed in water, respectively. The following table gives an impression of the packing density in the various mortars:

TABLE III

| | Series No. | | | |
|---|---|---|---|---|
| | 1 | 2 | 3 | 4 |
| | | Filler type | | |
| | silica dust | Microdan 5 | Portland cement | silica dust |
| | | Consistency | | |
| | plastic to viscous | plastic to viscous | plastic to viscous | soft |
| | | (volume ratios) | | |
| Fluid*/Solid** | 0.44 | 0.74 | 0.84 | 0.55 |
| Fluid*/(Solid + fluid) | 0.31 | 0.42 | 0.46 | 0.35 |
| Solid/(Solid + fluid) | 0.69 | 0.58 | 0.54 | 0.65 |
| (Water × pw)/(Solid × pc) | 0.12 | 0.17 | 0.20 | 0.16 |

*Mighty is included as fluid, referring to disolved state.
**Solid is cement + filler.
pw: The density of water.
pc: The density of cement.

The volume ratio fluid/solid varies from 0.44 with the extremely fine silica dust via 0.74 for the material with a filler which is only a little finer than cement, to 0.84 for the reference mortar in which the filler is cement. This is in complete conformity with experience from packing of large particle systems. The same is expressed in another form in the two last rows. It is interesting to note that the so-called water/cement ratio (weight ratio between water and cement) would be as low as 0.12 for the silica cement system if silica had the same density as cement, versus 0.20 for a pure cement, in spite of the fact that this volume (0.20) is extremely low and only obtainable with a high dosage of superplasticiser.

The density measurements indicate that the mortars in the above experiments were densely packed without any significant amount of entrapped air ($\approx 1.2\%$). The following densities were found:

| Series 1 | silica dust | 2466 kg/m³ |
|---|---|---|
| Series 2 | Microdan 5 | 2424 kg/m³ |
| Series 3 | cement | 2428 kg/m³ |
| Series 4 | silica dust + | |
| | 1% steel fibers | 2449 kg/m³ |
| | 2% steel fibers | 2484 kg/m³ |
| | 4% steel fibers | 2619 kg/m³ |
| | about 5% steel fibers | 2665 kg/m³ |

The amount of Mighty in the above materials is high such as appears from the below ratios:

| Mighty/Filler | 0.23 |
|---|---|
| Mighty/Total solid | 0.06 |
| Mighty/Water | 0.15 |

This shows that the dispersing agent (organic molecules) takes up much space, that is, 15% relatively to the water, and more than 20% relatively to the fine filler. To obtain an indication of the quality of the cement/silica dust mortar, one of the cylinders from Series 1 was tested in compression after curing in water at 20° C. for two days and autoclaving at 214° C. and 20 atm. for about 24 hours (in water). The compressive strength was found to be 161.2 MPa.

EXAMPLE 4

Preparation of the polypropylene fibers used in Example 2

The polypropylene used was GWE 23 from ICI with melt index of 3 g/10 minutes measured according to DIN MFI 230/2.16.

In a standard extrusion/stretch plant, the polypropylene was extruded into a blown tubular film at an extruder temperature of 180°-220° C., and the tubular film was cooled with cooling air at 18°-20° C. and cut into two film bands.

From the drawing station following the extruder the film was passed through a hot air oven with an air temperature of 180° C. and an air velocity of 25 m/second. By using a higher roller speed in the stretch station following the hot air oven, the film was stretched in a ratio of 1:17. Thereafter, the film was heat-stabilized by passing a hot air oven with an air temperature of 180° C. and an air velocity of 25 m/sec., the film velocity being about 90 m/sec. The thickness of the film was then 20/μ.

The film was fibrillated to form fibers of from 2 to 30 dtex by means of a Reifenhäuser FI-S-0800-03-01 fibrillator with 13 needles per cm in each of two consecutive staggered needle rows placed with the same distance as the interval between two needles. The fibrillation ratio (=the ratio between the film advancing velocity and the circumferential velocity of hydrophilic avivage (Henkel LW 421)) was applied as an 1:9 aqueous slurry, and the fibers were cut in lengths of 6 mm in a staple cutter.

EXAMPLE 5

Experiments were performed with varying silica/-silica+cement-ratio using concrete of the same composition as in Example 1 with respect to stone, sand, total volume amount of powder (Portland cement+silica) and Mighty.

In the experiments, the ratio silica to Portland cement+silica was varied between 0, 10, 20, 30, 40, and 50 percent by volume. In the individual cases, the amount of water was adapted so that the fresh concrete obtained had substantially the same consistency (as measured by spreading cone) as in Example 1. The mixing and casting procedures were as in Example 1.

From each of the 6 compositions, two 35 liter batches were made and cast in 16 concrete cylinders of 10×20 cm which were stored in water at 20° C.

For each mixture, two samples were tested after 28 days, which means that for each of the 6 compositions 4 specimens were tested.

The deviation of the experimental results was of the same order as in Example 1.

The mean values appear from the below table:

TABLE IV

Compressive strength of $10^\phi \times 20$ cm concrete cylinders containing varying amounts of silica dust in concrete with constant total volume of Portland cement + silica. Test specimens stored in water at 20° C. for 28 days.

| Volume ratio between silica and silica + cement, percent | 0 | 10 | 20 | 30 | 40 | 50 |
|---|---|---|---|---|---|---|
| Compressive strength, MPa | 84.5 | 109.6 | 118.5 | 119.0 | 117.2 | 112.9 |

EXAMPLE 6

Small specimens of a complex shape (an 1:40 model of a tetrapode to be used in hydraulic model experiments in connection with harbour construction) were cast from an ordinary superplasticised cement mortar with low water/cement-ratio. An extremely high amount of superplasticiser was used. When the casting was finished, it was observed that internal liquid transport had taken place with resulting bleeding and internal separation, resulting in models having a poor quality surface.

The same procedure was repeated, but this time replacing 10 percent of the cement with silica dust, while still using an extremely high amount of superplasticiser. This time, no bleeding occurred, and a completely satisfactory surface was obtained.

EXAMPLE 7

Comparison of mortars made with Portland cement and aluminous cement

Experiments were made with two different dispersing agents—Mighty and sodium tripolyphosphate—used in silica-cement mortars with Portland cement and aluminous cement, respectively, to ascertain the water demand necessary to obtain fluid to plastic consistency of the mass to be cast. The following 5 series of experiments were performed:

1. Casting of cement mortars with a binder matrix consisting of 2706 g of Portland cement and 645 g of silica dust in five different batches containing 164, 82, 41, 20.5 and 0 g, respectively, of Mighty (dry powder).
2. Casting of cement mortars with a binder matrix consisting of 1813 g of Portland cement and 1290 g of silica dust in five different batches containing 164, 82, 41, 20.5 and 0 g, respectively, of Mighty (dry powder).
3. Casting of cement mortars with a binder matrix similar to series 2, with the exception that the Portland cement was replaced with 1725 g of aluminous cement and that the batch containing 20.5 of Mighty was omitted.
4. Casting of two batches of cement mortar with a binder matrix consisting of 1290 g of silica dust, the two batches containing almost the same amount of sodium tripolyphosphate (14.4 and 12.8 g, calculated on dry powder), but with different types of cement, that is, 1725 g of aluminous cement in the first batch and 1813 g of Portland cement in the second batch.
5. Casting of four batches of mortar with a binder matrix containing 3626 g of Portland cement without silica dust, using 82, 41, 20.5 and 0 g, respectively, of Mighty (dry powder).

In all of the 5 series, the following common components were included (with reference to one batch):

| Quartz sand | 1–4 mm | 2763 g |
|---|---|---|
| | 0.25–1 mm | 1380 g |
| | 0–0.25 mm | 693 g |

The volume of fine powder (cement+silica dust) was the same in all mixes, namely approximately 1160 cm³. The water demands, that is, the amount of water used in the various mixes in order to obtain the specified consistency, were ascertained by trial mixing. The water demands appear from the table. The right hand column states the volume of water in relation to the volume of cement+silica dust.

Mixing

The mixing was performed in a kneading machine with planetary movement using a mixing blade. The following procedure was followed for batches with Mighty:

1) Dry mixing of sand, cement+silica dust for 5 minutes,
2) Addition of the major portion of the water and continued mixing for 5 minutes (as in Example 3).

3) Addition of a solution of the dispersing agent (a solution of Mighty powder in water in the weight ratio 1:2) and mixing for 10-20 minutes.

For batches containing no dispersing agent, wet mixing for 5-10 minutes was performed. For batches with sodium tripolyphosphate, 400-450 g of a 3.2% solution of sodium tripolyphosphate were added directly to the dry mix. For the mixes requiring more water, this was added afterwards during the wet mixing.

The consistency was evaluated by measuring the spreading of a cone of the material formed by pouring the material into a 5 cm high brass cone mould with bottom diameter 10 cm and upper diameter 7.1 cm on a flow table with brass surface for use in testing hydraulic cement (ASTM C 230-368) and removing the mould. The diameter of the material was measured a) immediately subsequent to removal of the mould, and b) after 10 strokes and c) after 20 strokes. The consistency was considered to be of the desired value for diameters of about 14 cm after 10 strokes and of 16 cm after 20 strokes.

In some of the cases, the water demand was determined by interpolation from tests with too much water (too large a diameter) and too little water (too small a diameter).

TABLE V

Water demand expressed in grams of water per batch and in relation to the total amount of fine powder (cement + silica dust) on a volume basis, the volume of fine powder being the same in all of the mixes (1160 cm³).

| Series No. 1 | 2706 g Portland cement 645 g silica dust | |
|---|---|---|
| Mighty (powder) | Water demand | |
| grams | gram | volume ratio |
| 164 | 500 | 0.43 |
| 82 | 500 | 0.43 |
| 41 | 530 | 0.46 |
| 20.5 | 710 | 0.61 |
| 0 | 1200 | 1.03 |
| Series No. 2 | 1813 g Portland cement 1290 g silica dust | |
| Mighty (powder) | Water demand | |
| grams | grams | volume ratio |
| 164 | 550 | 0.47 |
| 82 | 550 | 0.47 |
| 41 | 580 | 0.50 |
| 20.5 | 860 | 0.74 |
| 0 | 1500 | 1.29 |
| Series No. 3 | 1725 g aluminous cement 1290 g silica dust | |
| Mighty (powder) | Water demand | |
| grams | grams | volume ratio |
| 164 | 490 | 0.42 |
| 82 | 490 | 0.42 |
| 41 | >530 | >0.46 |
| 0 | 1090 | 0.94 |
| Series No. 4 | 1290 g silica dust approx. 14 g sodium tripolyphosphate (STP) | |
| Cement + STP (powder) | Water demand | |
| grams | grams | volume ratio |
| aluminous cement + STP | 1725 14.4 | >436* >0.37 |
| Portland cement + STP | 1813 12.8 | >1287** <1.11 |
| Series No. 5 | 3626 gram Portland cement no silica dust | |
| Mighty (powder) | Water demand | |

TABLE V-continued

Water demand expressed in grams of water per batch and in relation to the total amount of fine powder (cement + silica dust) on a volume basis, the volume of fine powder being the same in all of the mixes (1160 cm³).

| grams | grams | volume ratio |
|---|---|---|
| 82 | 760 | 0.66 |
| 41 | 760 | 0.66 |
| 20.5 | 840 | 0.72 |
| 0 | ~1140 | 0.98 |

*When visually evaluated, the mortar appeared sufficiently fluid, but the diameter of the cone was only 10 cm.
**The mixture had consistency as stiff foam. Upon further addition of 40 g of the Mighty solution 1:2, this mix became easily flowable.

Comments on the test results

1. Mixes with Portland cement, silica dust and relatively high amounts of Mighty have a very small water demand: 0.42-0.47 on a volume basis (corresponding to a water/powder ratio of 0.15-0.18 on a weight basis).
2. In comparison with mixes without dispersing agent, the water demand is reduced to between half and ¼.
3. Compared with mixes without silica dust (only Portland cement), the water demand for mixes with 30 and 50% by volume of silica dust, respectively, without Mighty is 5 and 32 per cent higher, respectively, than for mixes with a neat cement, while the water demands for the corresponding mixes with a high dosage of Mighty are 34 and 28 per cent smaller, respectively, than for the corresponding mixes with neat cement and high dosage of Mighty.
4. In a system of aluminous cement and silica dust, the same low water demand is obtained at a high dosage of Mighty as in a system of Portland cement and silica dust.
5. Sodium tripolyphosphate has a beneficial influence on mixes of aluminous cement and silica dust, but is without any effect (high water demand) on corresponding mixes with Portland cement.

EXAMPLE 8

Freezing tests on concrete cylinders

A concrete cylinder having a diameter of 10 cm and a height of 20 cm was made with Portland cement, silica dust and Mighty (a specimen from the same charge as described in Example 1). Before testing, the cylinder was stored in water at 20° C. for almost 5 months. Together with 4 reference specimens, the cylinder was subjected to a very tough freezing test which normally destroys all concrete in less than 2-3 weeks. The reference specimens were 1 cylinder of diameter 15 cm and height 30 cm of a concrete with a water/cement ratio of 0.7, 1 cylinder of diameter 15 cm and height 30 cm of a concrete with a water/cement ratio of 0.4 and 2 cylinders of diameter 10 cm and height 20 cm of a high quality concrete with 600 kg cement/m³ and a water/cement ratio of about 0.25 produced with a high dosage of Mighty, but without silica. All of these specimens had been cast previous to the sample with cement, silica dust and Mighty.

The testing involved the following exposures:

| Each Tuesday, Wednesday and Thursday, the following cycle was performed: | thawing in a 7.5% NaCl solution at 20° C. from 8-10 a.m. drying in a an oven at 105° C. from 10 a.m. to 2 p.m. |
|---|---|

| | |
|---|---|
| | storage in a 7.5% NaCl solution at 20° C. from 2 to 4 p.m. |
| | storage in a freezer at −20° C. from 4 p.m. to 8 a.m. the next day |
| Each Friday, the following cycle was performed: | thawing in 7.5% NaCl solution at 20° C. from 8 to 10 a.m. |
| | drying in an oven at 105° C. from 10 a.m. to 2 p.m. |
| | storage in 7.5% NaCl solution at 20° C. until Monday at 10 a.m. |

The destruction of the specimens was assessed visually and by measuring the ultrasonic velocity (decrease of the ultrasonic velocity indicates destruction of the structure).

Results

After 3 weeks: all of the reference specimens had been destroyed, the destruction stage being defined as the stage at which the ultrasonic velocity has decreased to less than half of the original value. The ultrasonic velocity in the silica dust-containing specimen was substantially unchanged.

After 3 months, the ultrasonic velocity in this specimen was still substantially unchanged.

After 6 months, the ultrasonic velocity had decreased to about 65%, and only after about 9 months, the ultrasonic velocity had decreased to half of the original value.

Comments on the test results

The experiments indicate that concrete and similar products produced with the new dense cement-silica matrix has a strongly improved resistance to freeze-thawing compared to corresponding products produced with traditional cement binder matrix.

EXAMPLE 9

High quality mortar

Four different mortar mixes were prepared, all on the basis of white Portland cement, silica dust and Mighty, but with different types of powder as replacement for some of the white Portland cement:

In all of the mixes, the following common components were used (with reference to one batch):

| Quartz sand | 1-4 mm | 2763 g |
|---|---|---|
| | 0.25-1 mm | 1380 g |
| | 0-0.25 mm | 693 g |
| Silica dust | | 645 g |
| 42% Mighty solution | | 195 g |
| Water | | 387 g |

| The following components were different: | | | | |
|---|---|---|---|---|
| | Mix No. | | | |
| | 1 | 2 | 3 | 4 |
| White Portland cement | 2706 | 1804 | 1804 | 1804 |
| Fine fly ash (5255 cm²/g) | | 694 | | |
| Fine sand (5106 cm²/g) | | | 765 | |
| Fine white cement (8745 cm²/g) | | | | 902 |

The volume of the fine powder was kept constant at about 1160 cm³.

Mixing

The mixing was performed as described in Example 7. The consistency was soft.

Casting and curing

From each batch, 2 cylinders of diameter 10 cm and height 20 cm were cast with slight vibration. The cylinders from mix No. 1 were stored in a closed mould for approx. 4 days at 60° C. and 2 days in water at 20° C., while the remaining cylinders were stored for 22 hours at 80° C. in the closed mould.

Testing

The compressive strength was determined. The results appear from the table:

| Mix No. | ⅓ of the cement replaced by | Curing | Compressive strength (MPa) |
|---|---|---|---|
| 1 | — | 4 days 60° C. | 179 |
| 2 | fly ash | 22 h. 80° C. | 160 |
| 3 | fine sand | 22 h. 80° C. | 150 |
| 4 | fine cement | 22 h. 80° C. | 164 |

Comments on the test results

The experiments demonstrate a very high strength of the binder matrix. In all cases, the fracture went through the quartz particles, which means that the strength level can undoubtedly be considerably increased by using a stronger sand material. In addition, the results demonstrate the possibility of replacing part of the Portland cement with a different powder of a fineness like that of cement or somewhat finer (fly ash and finely ground sand). Finally, the results demonstrate the possibility of utilizing an altered cement grain size distribution, in this case demonstrated by replacing ⅓ of the ordinary white Portland cement with a finely ground white Portland cement.

EXAMPLE 10

Fixation of smooth 6 mm steel bars

Very smooth 6 mm diameter steel bars were cast into silica-cement mortar (compressive strength 179 MPa) prepared as described in Example 9, Series 1, and into reference mortar (compressive strength 38 MPa), prepared from ordinary mortar with the same type of white Portland cement, but without silica dust and without Mighty, and having a water/cement ratio of 0.5. The bars were cast into the mortar to a depth of 60 mm, 100 mm of the bars protruding from the specimen for fixation in a testing machine. The silica cement mortar and the reference mortar samples were stored as stated in Example 9, Series 1, prior to testing.

In an Instron machine, the force necessary for drawing the steel bars out of the mortar, and the force/displacement curves were recorded. From these data, the work involved in the drawing out operation, the average shear stress along the surface of the steel bars, and the tensile stress in the steel bars were calculated.

The results appear from the below table, the work stated being the work necessary for 10 mm drawing out of the steel bars:

| Type of mortar | Max. force KN | Work NM | Max. average shear stress MPa | Max. average tensile stress in bars MPa |
|---|---|---|---|---|
| Cement-silica | 9.25 | 61.5 | 8.19 | 327 |
| Cement-silica | 9.25 | 56.1 | 8.19 | 327 |
| Cement-silica | 5.00 | 42.0 | 4.42 | 176* |

-continued

| Type of mortar | Max. force KN | Work NM | Max. average shear stress MPa | Max. average tensile stress in bars MPa |
|---|---|---|---|---|
| Reference | 1.66 | 5.8 | 1.47 | 52 |
| Reference | 2.13 | 8.2 | 1.88 | 75 |

*The results of this apparently uncharacteristic experiment are not included in the below comments on the results.

Comments on the results

The experiments were performed with steel bars which are considerably smoother than the reinforcement used in ordinary reinforced concrete (with a surface appearing like polished steel and without any corrosions). In spite of this, an extremely good fixation of the bars in the silica-cement mortar was obtained. In spite of the very short depth to which the bar was cast in the specimens (6 cm), a force corresponding to about 70% of the yield stress of the steel was required to draw out the bars. It will be noted that the resistance to drawing out is 4-6 times higher that in the reference mortar, which is about the ratio between the compressive strength of the materials. The work necessary for drawing out the bars was additionally increased, as this work was 8-10 times greater in the silica-cement mortar than in the normal cement mortar.

EXAMPLE 11

Grout of mortar

A mortar with sand particles up to 4 mm was prepared in order to evaluate the possibility of preparing easily flowable coherent grout with a large content of rather coarse sand and to demonstrate a mixing sequence well adapted for prefabrication of grout materials in a form in which only water is to be added on the job. The components used in the mortar were very similar to those used in Example 9, Mix No. 1, the amount of Mighty and the water content being slightly higher. The mixing equipment was the same as in Example 9. In the mix, the following components were used:

| Quartz sand | 1-4 mm | 2763 g |
|---|---|---|
|  | 0.25-1 mm | 1380 g |
|  | 0-0.25 mm | 693 g |
| White Portland Cement |  | 2706 g |
| Silica dust |  | 645 g |
| Water |  | 600 g |
| Mighty (dry powder) |  | 120 g |

Mixing 15 minutes dry mixing of cement+silica+sand+dry Mighty powder. Then, addition of 500 g of water and mixing for 5 minutes. Thereafter, addition of 100 g water and mixing for 5 minutes. The consistency of the mix after addition of 500 g water and 3 minutes was, as assessed visually, very similar to the one in Example 9, Mix No. 1, which contained the same amount of water (in spite of the altered mixing sequence). The consistency after adding additionally 100 g of water was very soft. The soft mortar was poured into a 2.5 meter narrow plastic hose (internal diameter 18 mm) arranged in U-shape, the ends of the U pointing upward having a length of about 90 cm. The mortar was introduced in the U-shaped plastic hose by pouring into the hose through a funnel with a shaft of 17 cm length and internal diameter 12 mm. To avoid blocking at the narrow opening of the funnel (the diameter being only 3 times the diameter of the largest particles), a steel rod of diameter 6 mm was moved up and down in the funnel opening. The mortar flowed easily as a medium-viscous liquid, completely filling the hose. The mass actually rose slightly higher in the free end of the hose than in the filling end, probably due to a certain pumping action of the rod.

Comments on the results

The experiment demonstrates the possibility of pumping a grout containing a large amount of coarser sand as a fluid coherent mass. Furthermore, the possibility of premixing dry matter, including the dispersing agent, was demonstrated.

What is claimed is:

1. A composite material for producing a shaped article, comprising
   (1) homogeneously arranged inorganic solid particles A of a size of from 50 Angstroms to 0.5 micron;
   (2) densely packed solid particles B having a size of 0.5-100 micron, being at least one order of magnitude larger than the particles A, and defining a void volume therebetween,
      the particles A being homogeneously arranged in the voids between particles B in an amount of 0.1-50% of the volume of particles A and B;
   (3) a surface-active dispersing agent in an amount sufficient to secure the homogeneous distribution of particles A between the densely packed particles B and to impart to the composite material a fluid to plastic consistency in a low stress field of less than 5 kg/cm$^2$; and
   (4) a liquid in an amount substantially sufficient to fill the voids between the particles A and B;
      the dense packing of particles B being substantially a packing corresponding to that obtainable by gentle mechanical influence on a system of geometrically equally shaped large particles in which locking surface forces do not have any significant effect.

2. A shaped article, comprising a coherent matrix prepared from the composite material defined in claim 1.

3. A process for preparing the shaped article of claim 2, which comprises:
   (a) initially mixing particles A and B with the surface-active dispersing agent and with the liquid to fill the voids between particles A and B;
   (b) mechanically mixing the aforesaid ingredients to produce a viscous to plastic mass; and
   (c) casting the mass within a stress field into the desired shape of said article.

4. The process of claim 3, wherein the stress field used for shaping the mass into said article is applied by extruding or rolling the mass under a shaping pressure of up to 100 kg/cm$^2$.

5. The process of claim 3, wherein particles B comprise at least 20% by weight of Portland Cement particles.

6. The process of claim 3, which comprises combining materials in step (a) with bodies C which have at least one dimension which is at least one order of magnitude larger than particles A.

7. The process of claim 6, wherein the additional bodies C comprise fibers.

8. The process of claim 3, wherein the particles A comprise ultra-fine silica particles, particles B comprise Portland Cement particles, the surface-active dispersing agent is a concrete superplasticizer, and in which the liquid is water in the proportion of up to 0.30 part by weight of water per part of the mixture of particles A and B.

9. The process of claim 8, wherein the water is present in the proportion of 0.12 to 0.30 part by weight per part of the mixture of particles A and B.

10. The process of claim 8, wherein the water is present in the proportion of 0.12 to 0.20 part by weight per part of the mixture of particles A and B.

11. The process of claim 8, wherein the superplasticizer is admixed, based upon the amount of superplasticizer dry matter, in an amount of from 1-4% by weight of the mixture of particles A and B.

12. A composite material for producing a shaped article, comprising
   (1) homogeneously arranged silica particles A of a size of from 50 Angstroms to 0.5 micron;
   (2) densely packed solid cement particles B having a size of 0.5-100 micron, being at least one order of magnitude larger than the silica particles A, and defining a void volume therebetween,
      the silica particles A being homogeneously arranged in the voids between cement particles B in an amount of 0.1-50% of the volume of particles A and B;
   (3) a concrete superplasticizer, the amount of superplasticizer dry matter being in the range of 1-4% by weight of the mixture of particles A and B, the amount of superplasticizer being sufficient to secure the homogeneous distribution of the silica particles between the densely packed cement particles; and
   (4) water in the proportion of 0.12 to 0.30 part by weight per part of the mixture of particles A and B, the amount of water being substantially sufficient to fill the voids between the particles A and B;
      the dense packing of particles B being substantially a packing corresponding to that obtainable by gentle mechanical influence on a system of geometrically equally shaped large particles in which locking surface forces do not have any significant effect.

13. The composite material of claim 12, wherein the silica particles A are ultrafine silica particles having a specific surface area of about $5 \times 10^4 - 2 \times 10^6 cm^2/g$.

14. The composite material of claim 13, wherein cement particles B comprise at least 20% by weight of Portland Cement particles.

15. The composite material of claim 12, wherein the water is present in the proportion of 0.12 to 0.20 part by weight per part of the mixture of particles A and B.

16. A shaped article, comprising a coherent matrix prepared from the composite material defined in claim 12.

17. The shaped article of claim 16, wherein the silica particles A are ultrafine silica particles having a specific surface area of about $5 \times 10^4 - 2 \times 10^6 cm^2/g$.

18. The shaped article of claim 16, wherein the cement particles B comprise at least 20% by weight of Portland Cement particles.

19. The shaped article of claim 16, wherein the water is present in the proportion of 0.12 to 0.20 part by weight per part of the mixture of particles A and B.

20. A process for preparing the shaped article of claim 16, which comprises
   (a) initially mixing particles A and B with the concrete superplasticizer and the water;
   (b) mechanically mixing the aforesaid ingredients to produce a viscous to plastic mass; and
   (c) casting the mass within a stress field into the desired shape of said article.

21. The process of claim 20, wherein the silica particles A are ultrafine silica particles having a specific surface area of about $5 \times 10^4 - 2 \times 10^6 cm^2/g$.

22. The process of claim 20, wherein the stress field used for shaping the mass into said article is below 5 $kg/cm^2$.

23. The process of claim 20, wherein the stress field used for shaping the mass into said article is applied by extruding or rolling the mass under a shaping pressure of up to 100 $kg/cm^2$.

24. The process of claim 20, wherein the cement particles B comprise at least 20% by weight of Portland Cement particles.

25. The process of claim 20, wherein the water is present in the proportion of 0.12 to 0.20 part by weight per part of the mixture of particles A and B.

26. A composite material for producing a shaped article, comprising
   (1) homogeneously arranged inorganic solid silica dust particles A of a size of from 50 Angstroms to 0.5 micron;
   (2) densely packed solid particles B having a size of 0.5-100 microns, being at least one order of magnitude larger than the particles A, and defining a void volume therebetween, at least 20% by weight of the particles B being Portland cement particles,
      the particles A being homogeneously arranged in the voids between particles B an amount of 10-30% of the volume of particles A and B;
   (3) a concrete superplasticizer, the amount of superplasticizer dry matter being in the range of 1-4% by weight, based on the total weight of the Portland cement and the silica dust; and
   (4) water in the proportion of 0.12-0.30 part by weight per part of the mixture of particles A and B;
      the dense packing of particles B being substantially a packing corresponding to that obtainable by gentle mechanical influence on a system of geometrically equally shaped large particles in which locking surface forces do not have any significant effect.

27. A shaped article comprising a coherent matrix prepared from the composite material defined in claim 26.

28. A shaped article according to claim 27 which is a protecting cover applied on steel, ordinary concrete, masonry, pavements or roads.

29. The composite material defined in claim 26, wherein the amount of superplasticizer dry matter is in the range of 2-4% by weight, based on the total weight of the Portland cement and the silica dust.

30. A shaped article comprising a coherent matrix prepared from the composite material defined in claim 29.

31. A shaped article according to claim 30 which is a protecting cover applied on steel, ordinary concrete, masonry, pavements or roads.

32. The composite material defined in claim 29, which comprises water in the proportion of 0.12-0.20 part by weight per part of the mixture of particles A and B.

33. A shaped article comprising a coherent matrix prepared from the composite material defined in claim 32.

34. A shaped article according to claim 33 which is a protecting cover applied on steel, ordinary concrete, masonry, pavements or roads.

35. The composite material defined in claim 26, additionally comprising fibers selected from the group consisting of metal fibers, mineral fibers, carbon fibers and organic fibers.

36. A shaped article comprising a coherent matrix prepared from the composite material defined in claim 35.

37. A shaped article according to claim 36 which is a protecting cover applied on steel, ordinary concrete, masonry, pavements or roads.

* * * * *